US012638587B2

(12) United States Patent
Machii et al.

(10) Patent No.: US 12,638,587 B2
(45) Date of Patent: May 26, 2026

(54) OBJECT DETECTION DEVICE

(71) Applicant: Hitachi Astemo, Ltd., Hitachinaka (JP)

(72) Inventors: Kimiyoshi Machii, Tokyo (JP);
Masayoshi Kuroda, Hitachinaka (JP);
Kosuke Sakata, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 877 days.

(21) Appl. No.: 17/922,637

(22) PCT Filed: Feb. 2, 2021

(86) PCT No.: PCT/JP2021/003648
§ 371 (c)(1),
(2) Date: Nov. 1, 2022

(87) PCT Pub. No.: WO2021/229864
PCT Pub. Date: Nov. 18, 2021

(65) Prior Publication Data
US 2023/0168378 A1 Jun. 1, 2023

(30) Foreign Application Priority Data

May 15, 2020 (JP) ................................. 2020-085573

(51) Int. Cl.
*G01S 17/89* (2020.01)
*G01S 17/931* (2020.01)
(52) U.S. Cl.
CPC ............ *G01S 17/89* (2013.01); *G01S 17/931* (2020.01)
(58) Field of Classification Search
CPC ........ G01S 17/89; G01S 17/931; G01S 7/497; G01S 7/4808
See application file for complete search history.

(56) References Cited

U.S. PATENT DOCUMENTS 6,833,807 B2 * 12/2004 Flacke ................... G01S 13/72
342/195
8,027,029 B2 * 9/2011 Lu ......................... G01S 7/4817
356/28
(Continued)

FOREIGN PATENT DOCUMENTS

JP 2013-156139 A 8/2013
JP 5978565 B2 8/2016
(Continued)

OTHER PUBLICATIONS

Japanese Office Action issued in corresponding JP Application No. 2020-085573, dated Jan. 9, 2024 (3 pages).
(Continued)

*Primary Examiner* — Assres H Woldemaryam
(74) *Attorney, Agent, or Firm* — Foley & Lardner LLP

(57) ABSTRACT

Provided is an object detection device capable of improving efficiency while ensuring detection accuracy.

An object detection device 1 includes a point cloud acquisition unit 201 that acquires point cloud data of an object according to a scanning result of a LiDAR 101, an object detection unit 204 that detects an object based on the point cloud data, and a reliability determination unit 205 that determines a reliability in a detection result of the object detection unit 204. The point cloud acquisition unit 201 controls the scanning range and the irradiation density of the LiDAR 101 on the basis of the reliability.

5 Claims, 25 Drawing Sheets

(56) References Cited

U.S. PATENT DOCUMENTS

| | | | | |
|---|---|---|---|---|
| 11,243,308 B2* | 2/2022 | Matsui | ................... | G01S 17/89 |
| 2017/0003392 A1 | 1/2017 | Bartlett et al. | | |
| 2017/0168146 A1* | 6/2017 | Boehmke | ............. | G01S 7/4814 |
| 2020/0041650 A1* | 2/2020 | Matsui | ................. | G01S 7/4817 |
| 2023/0105832 A1 | 4/2023 | Yamamoto et al. | | |

FOREIGN PATENT DOCUMENTS

| | | | | |
|---|---|---|---|---|
| JP | 2019-090628 A | | 6/2019 |
| JP | 2019132795 A | * | 8/2019 |
| JP | 2020-052051 A | | 4/2020 |
| WO | WO-2019/082926 A1 | | 5/2019 |

OTHER PUBLICATIONS

International Search Report with English Translation and Written Opinion dated May 18, 2021 in corresponding International Application No. PCT/JP2021/003648.

* cited by examiner

Figure 2:
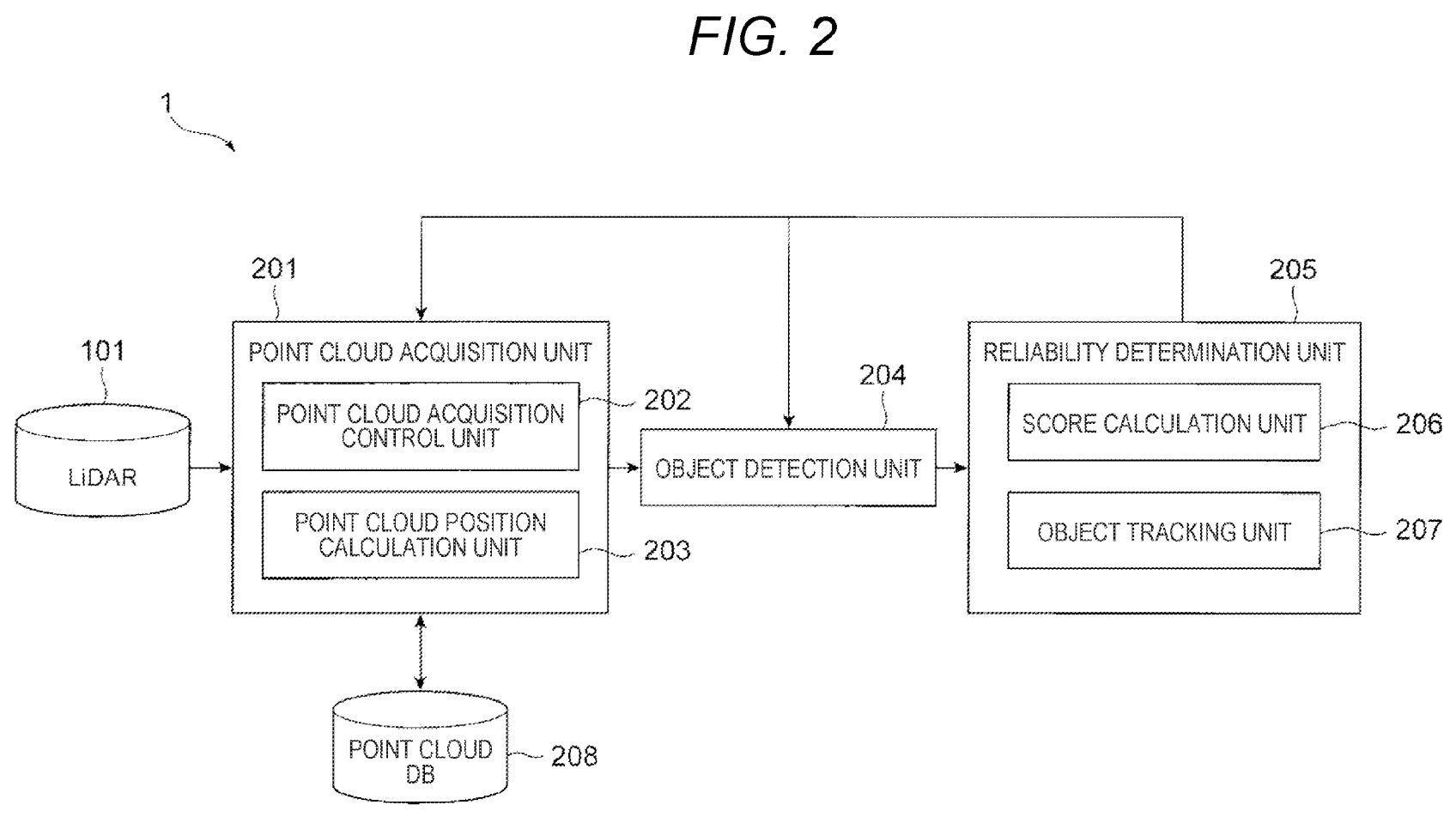

101 LiDAR

201 POINT CLOUD ACQUISITION UNIT

202 POINT CLOUD ACQUISITION CONTROL UNIT

203 POINT CLOUD POSITION CALCULATION UNIT

208 POINT CLOUD DB

204 OBJECT DETECTION UNIT

205 RELIABILITY DETERMINATION UNIT

206 SCORE CALCULATION UNIT

207 OBJECT TRACKING UNIT (a)                                                              (b)

|  |  | FIRST THRESHOLD | SECOND THRESHOLD | THIRD THRESHOLD | FOURTH THRESHOLD |
|---|---|---|---|---|---|
|  |  | 1801 | 1802 | 1803 | 1804 |
| WIDTH | PEDESTRIAN | 0.3m | 0.4m | 0.5m | 0.6m |
|  | TWO-WHEELED VEHICLE | 0.6m | 0.7m | 1.2m | 1.3m |
|  | FOUR-WHEELED VEHICLE | 1.3m | 1.5m | 2.0m | 2.2m |
|  | TRUCK | 1.4m | 1.7m | 2.5m | 2.7m |
| DEPTH | PEDESTRIAN | 0.3m | 0.4m | 0.5m | 0.6m |
|  | TWO-WHEELED VEHICLE | 0.3m | 0.4m | 2.5m | 2.6m |
|  | FOUR-WHEELED VEHICLE | 0.3m | 0.4m | 5.1m | 5.2m |
|  | TRUCK | 0.3m | 0.4m | 15.1m | 15.2m |
| HEIGHT | PEDESTRIAN | 1.1m | 1.2m | 1.9m | 2.0m |
|  | TWO-WHEELED VEHICLE | 1.1m | 1.2m | 1.7m | 1.8m |
|  | FOUR-WHEELED VEHICLE | 0.7m | 0.8m | 1.9m | 2.0m |
|  | TRUCK | 1.8m | 1.9m | 3.5m | 3.6m |

SCORE 0      1.0      0      [m]

VARYING BETWEEN 0 TO 1.0

| TYPE | SCORE | | | RELIABILITY | DETERMINATION |
|---|---|---|---|---|---|
| | WIDTH | DEPTH | HEIGHT | | |
| PEDESTRIAN | 0.01 | 0.01 | 1.0 | 0.0001 | NEGATION |
| TWO-WHEELED VEHICLE | 0.01 | 0.01 | 1.0 | 0.0001 | NEGATION |
| FOUR-WHEELED VEHICLE | 1.0 | 1.0 | 1.0 | 1.0 | DETERMINATION |
| TRUCK | 0.67 | 1.0 | 0.01 | 0.0067 | NEGATION |

| TYPE | SCORE | | | RELIABILITY | DETERMINATION |
|---|---|---|---|---|---|
| | WIDTH | DEPTH | HEIGHT | | |
| PEDESTRIAN | 0.01 | 0.01 | 0.01 | 0.000001 | NEGATION |
| TWO-WHEELED VEHICLE | 0.01 | 1.0 | 0.01 | 0.0001 | NEGATION |
| FOUR-WHEELED VEHICLE | 0.5 | 1.0 | 1.0 | 0.5 | UNKNOWN |
| TRUCK | 0.01 | 1.0 | 0.01 | 0.0001 | NEGATION |

(a)

POINT CLOUD INTERVAL: 0.3m

WIDTH: 1.2m STRONG?

(b)

WIDTH: 1.8m WEEK?

(c)

OBJECT INTERVAL: 0.25m

SAME OBJECT?

$$\text{OVERLAP RATIO} = \frac{1.8 - 1.5}{2.0 - 1.2} = 0.375$$

(a)

(b)

(c)

| TYPE | SCORE | | | RELIABILITY | DETERMINATION |
|---|---|---|---|---|---|
| | WIDTH | DEPTH | HEIGHT | | |
| PEDESTRIAN | 0.01 | 0.01 | 1 | 0.0001 | NEGATION |
| TWO-WHEELED VEHICLE | 0.01 | 1 | 1 | 0.01 | NEGATION |
| FOUR-WHEELED VEHICLE | 0.01 | 1 | 1 | 0.01 | NEGATION |
| TRUCK | 0.01 | 1 | 0.01 | 0.0001 | NEGATION |

OBJECT DETECTION DEVICE

TECHNICAL FIELD

The present invention relates to an object detection device.

BACKGROUND ART

In automatic driving, highly accurate detection of an object is required in order to avoid collision with another vehicle or an obstacle present around the vehicle. As an object detection technique, an object detection technique using light detection and ranging (LiDAR), radar, or the like that emits a laser beam to scan the periphery of a vehicle is known.

In general, in an object detection technique using LiDAR, an irradiation point of a laser beam with respect to a distant object or a small object becomes sparse, so that it is difficult to detect a distant object or a small object. In recent years, LiDAR models capable of dynamically changing a scanning range and an irradiation density have appeared. The LiDAR capable of dynamically changing the scanning range and the irradiation density can clearly detect the type of object by scanning a distant object or a small object with an increased irradiation density. However, since it is inefficient to increase the irradiation density for scanning all objects, it is important to select an object to be scanned by increasing the irradiation density.

PTL 1 describes a monitoring device that detects an object using a laser beam emitted from a light source and reflected by the object. In a case where a plurality of objects is detected, the monitoring device described in PTL 1 scans the irradiation point where the object having the highest relative speed with respect to the own vehicle among the plurality of objects is detected in a mode in which the irradiation density is increased in preference to other irradiation points.

CITATION LIST

Patent Literature

PTL 1: JP 5978565 B2

SUMMARY OF INVENTION

Technical Problem

However, in the monitoring device described in PTL 1, the mode for increasing the irradiation density of the laser beam is canceled only when an object that is a target of the mode is no longer detected. The monitoring device described in PTL 1 scans an object in the mode as long as the object is detected regardless of the position of the object in the mode. Therefore, the monitoring device described in PTL 1 continues scanning in the mode even after the scanning in the mode becomes unnecessary, which is inefficient. In addition, in the monitoring device described in PTL 1, even if an unknown object appears during scanning in this mode, there is a possibility that the unknown object cannot be detected.

The present invention has been made in view of the above, and an object of the present invention is to provide an object detection device capable of improving efficiency while securing detection accuracy.

Solution to Problem

In order to solve the above problem, an object detection device according to the present invention includes: a point cloud acquisition unit configured to acquire point cloud data of an object existing in a periphery of a vehicle according to a scanning result of a sensor that scans the periphery of the vehicle; an object detection unit configured to detect the object based on the point cloud data; and a reliability determination unit configured to determine a reliability in a detection result of the object detection unit. The point cloud acquisition unit controls a scanning range and an irradiation density of the sensor based on the reliability.

Advantageous Effects of Invention

According to the present invention, it is possible to provide an object detection device capable of improving efficiency while securing detection accuracy. Objects, configurations, and effects besides the above description will be apparent through the explanation on the following embodiments.

BRIEF DESCRIPTION OF DRAWINGS

FIG. 2 is a diagram illustrating a functional configuration of the object detection device illustrated in FIG. 1.

DESCRIPTION OF EMBODIMENTS

Figure 1:
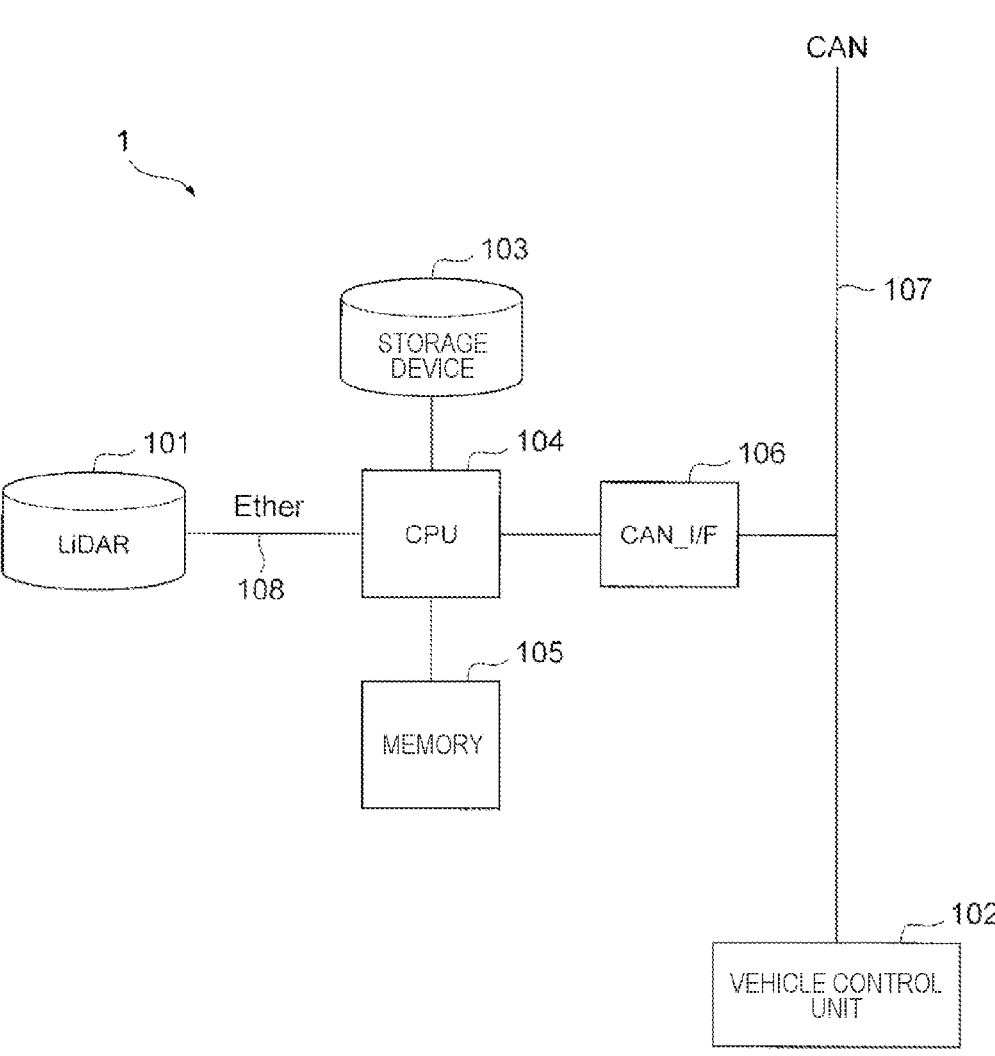
FIG. 1 is a diagram illustrating a hardware configuration of an object detection device according to Embodiment 1.

Hereinafter, embodiments of the present invention will be described using the drawings. Configurations denoted by the same reference numerals in the respective embodiments have similar functions in the respective embodiments unless otherwise specified, and thus the description thereof will be omitted.

Embodiment 1

FIG. 1 is a diagram illustrating a hardware configuration of an object detection device 1 according to Embodiment 1.

The object detection device 1 is a device that is mounted on a vehicle and monitors the surroundings of the vehicle. The object detection device 1 is a device that detects an object existing in the periphery of a vehicle. The object detection device 1 is connected to a vehicle control unit 102 via a CAN bus 107.

The object detection device 1 includes a LiDAR 101, a storage device 103, a CPU 104, a memory 105, and a CAN_I/F 106.

The LiDAR 101 emits one or a plurality of laser beams from the vehicle toward the surroundings, receives reflected light thereof, and acquires data such as a distance, a direction, and a reflection intensity of the laser beam to a reflection position. This data is converted into point cloud data. Unlike using a camera, the object detection device 1 using the LiDAR 101 can acquire point cloud data without depending on the brightness of the surroundings, and can detect an object regardless of day or night or the weather. The LiDAR 101 is connected to the CPU 104 via an Ethernet 108 and transmits acquired data to the CPU 104. A protocol in this connection generally uses a user datagram protocol (UDP).

The storage device 103 stores map information and data necessary for automatic driving. The storage device 103 can also store a value of a calibration parameter of the LiDAR 101.

The CPU 104 converts the data acquired by the LiDAR 101 into point cloud data, and performs object detection processing of detecting an object existing in the periphery of the vehicle on the basis of the point cloud data. The CPU 104 causes the memory 105 to store data and processing results required in the processing. For example, the CPU 104 transmits the point cloud data converted from the data acquired by the LiDAR 101 to the memory 105, and stores the point cloud data in, for example, a buffer corresponding to the data structure illustrated in FIG. 4. The CPU 104 controls the CAN_I/F 106 such that a processing result is transmitted to the vehicle control unit 102 via the CAN bus 107. The CPU 104 acquires dead reckoning information such as a traveling direction and a speed of the vehicle created by the vehicle control unit 102 via the CAN_I/F 106.

The vehicle control unit 102 includes an ECU or the like that controls the traveling direction and speed of the vehicle. The vehicle control unit 102 takes in a processing result of the object detection processing by the CPU 104 and controls traveling of the vehicle. The vehicle control unit 102 creates the dead reckoning information of the traveling direction and the speed of the vehicle, and transmits the dead reckoning information to the CPU 104 via the CAN bus 107 and the CAN_I/F 106.

FIG. 2 is a diagram illustrating a functional configuration of object detection device 1 illustrated in FIG. 1.

The object detection device 1 includes a point cloud acquisition unit 201, an object detection unit 204, a reliability determination unit 205, and a point cloud DB 208.

The point cloud acquisition unit 201 acquires point cloud data of an object existing in the periphery of the vehicle according to a scanning result of the LiDAR 101, which is a sensor that scans around the vehicle. The point cloud acquisition unit 201 includes a point cloud acquisition control unit 202 that controls the scanning range and the irradiation density of the LiDAR 101 on the basis of the determination result of the reliability determination unit 205, and a point cloud position calculation unit 203 that acquires point cloud data from the scanning result of the LiDAR 101. The irradiation density is the number of irradiation points per unit volume of an object irradiated with laser beams emitted from the LiDAR 101. As the irradiation density increases, the point cloud density, which is the number of individual three-dimensional points included in the point cloud data per unit volume, also increases. As the irradiation density increases, the interval between the irradiation points decreases, and the point cloud interval, which is the interval between the three-dimensional points, also decreases. The point cloud position calculation unit 203 acquires point cloud data by converting data such as the distance and direction to the reflection position of the laser beam acquired by the LiDAR 101 into three-dimensional points having three-dimensional coordinates and the like. The point cloud position calculation unit 203 transmits the acquired point cloud data to the point cloud DB 208 and the object detection unit 204.

The point cloud DB 208 stores the point cloud data transmitted from the point cloud position calculation unit 203 of the point cloud acquisition unit 201. The object detection unit 204 detects surrounding objects on the basis of the point cloud data acquired by the point cloud acquisition unit 201. Specifically, the object detection unit 204 detects the position and type of the object according to the three-dimensional coordinates included in the point cloud data transmitted from the point cloud position calculation unit 203 of the point cloud acquisition unit 201.

The reliability determination unit 205 determines the reliability in the detection result of the object detection unit 204. Specifically, the reliability determination unit 205 calculates the reliability of the object (hereinafter, also referred to as a "detection object") to be detected by the object detection unit 204 for each predetermined type of object, and determines the type of the detection object according to the calculated reliability. The reliability is an index obtained by quantifying whether the type of the object can be determined for each detection object. The numerical range of the reliability is more than 0.0 and 1.0 or less. As the reliability is higher, the type of the object is more easily determined.

The reliability determination unit 205 includes a score calculation unit 206 that calculates the reliability using the score of each parameter of the detection object and determines the type of the detection object according to the calculated reliability, and an object tracking unit 207 that tracks the movement of the detection object. The parameter is an index representing an attribute of an object of interest when the type of the detection object is determined. The parameter is, for example, a size of the object such as a depth, a width, and a height of the object, a speed of the object, or the like. The parameter has different possible ranges for each type of object. In the score calculation unit 206, a parameter and a possible range of the parameter for each type are determined in advance. In the present embodiment, each of the depth, the width, and the height of the object that determines the size of the object is used as a parameter. The score is an index obtained by quantifying how much the parameter of the detection object conforms to the possible range of the parameter for each type. The score calculation unit 206 calculates a score obtained by quantifying the compatibility of the parameter of the detection object with the range for each type. In the present embodiment, the score calculation unit 206 calculates a score obtained by quantifying the compatibility of the size of the detection object with the range for each type. That is, the score calculation unit 206 calculates, for each type, a score obtained by quantifying compatibility of each of the depth, the width, and the height of the detection object with the corresponding range. The numerical range of the score is more than 0.0 and 1.0 or less. As the score is higher, the parameter of the detection object easily fits the range.

The score calculation unit 206 calculates the reliability for each type using the calculated scores for the depth, width, and height of the detection object. The score calculation unit 206 determines the type of the detection object according to the calculated reliability for each type. Specifically, when the reliability of a certain type is smaller than a first reference value (for example, 0.3), the score calculation unit 206 denies the certain type as the type of the detection object. When the reliability of a certain type is greater than or equal to a second reference value (for example, 0.6), the score calculation unit 206 determines the certain type as the type of the detection object. When the reliability of a certain type is equal to or greater than the first reference value and smaller than the second reference value, the score calculation unit 206 does not deny or confirm the certain type as the type of the detection object, and determines that the type of the detection object is unknown. The first reference value and the second reference value are values determined in advance within a range of 0.0 or more and 1.0 or less. The second reference value is larger than the first reference value. The score calculation unit 206 transmits the determination result of the type of the detection object to the point cloud acquisition unit 201 and the object detection unit 204.

Figure 3:
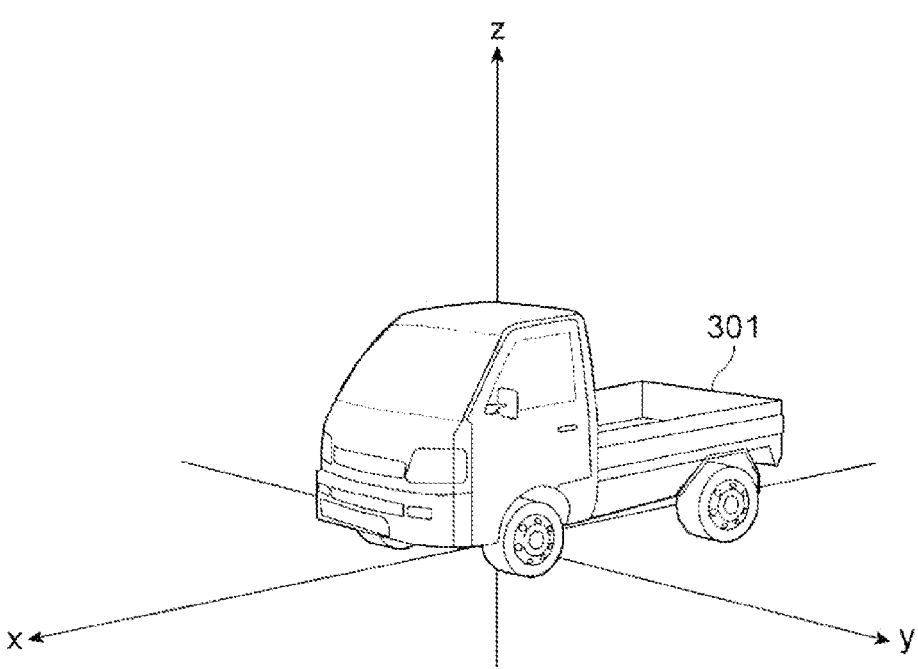
FIG. 3 is a diagram illustrating a coordinate system used in the object detection device illustrated in FIG. 2.

FIG. 3 is a diagram illustrating a coordinate system used in object detection device 1 illustrated in FIG. 2.

In the present embodiment, an orthogonal coordinate system with the position of a own vehicle 301 on which the object detection device 1 is mounted as an origin is used. In the present embodiment, a coordinate axis along the traveling direction of the own vehicle 301 is an x axis, and the forward direction of the own vehicle 301 is a positive direction of the x axis. In the present embodiment, a coordinate axis along the vehicle width direction of the own vehicle 301 is a y axis, and a direction from right to left in the traveling direction of the own vehicle 301 is a positive direction of the y axis. In the present embodiment, a coordinate axis perpendicular to the road surface (coordinate axis along the gravity direction) is defined as the z axis, and a direction away from the road surface (anti-gravity direction) is defined as a positive direction of the z axis.

Figure 4:
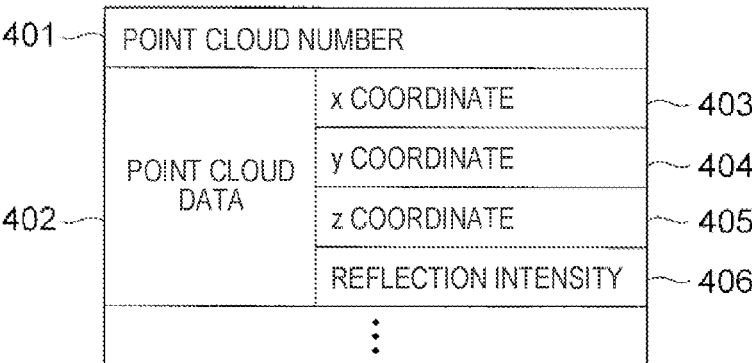
FIG. 4 is a diagram for explaining a data structure of data stored in a point cloud DB illustrated in FIG. 2.

FIG. 4 is a diagram for explaining a data structure of data stored in the point cloud DB 208 illustrated in FIG. 2.

The data stored in the point cloud DB 208 includes a point cloud number 401 indicating the number of pieces of point cloud data 402 and each piece of the point cloud data 402. The data stored in the point cloud DB 208 has a structure in which the point cloud data 402 is listed by the point cloud number 401. Each piece of the point cloud data 402 includes an x coordinate 403, a y coordinate 404, a z coordinate 405, and a reflection intensity 406 of an individual three-dimensional point. The x coordinate 403, the y coordinate 404, and the z coordinate 405 follow the coordinate system of FIG. 3.

Figure 5:
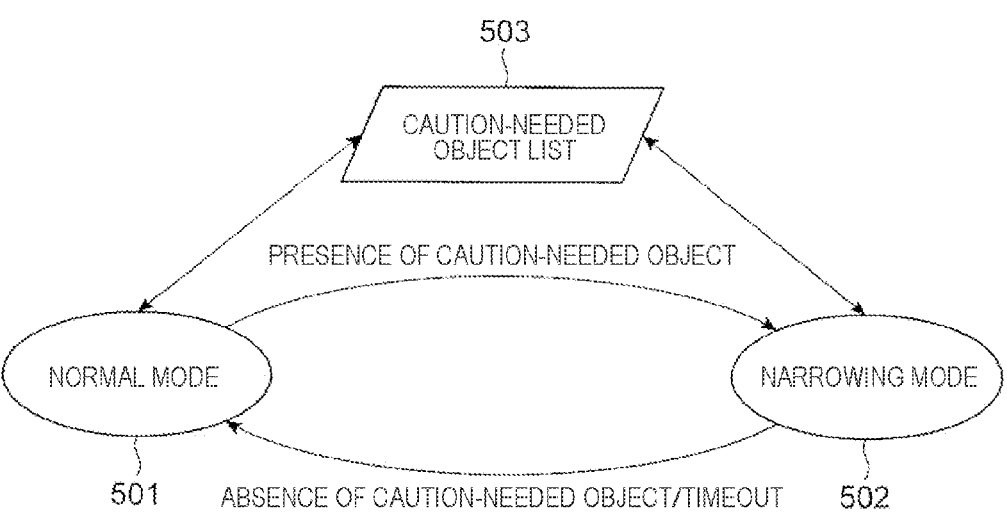
FIG. 5 is a state transition diagram related to a scanning mode of LiDAR illustrated in FIG. 2.

FIG. 5 is a state transition diagram regarding the scanning mode of the LiDAR 101 illustrated in FIG. 2.

The LiDAR 101 can scan around the own vehicle 301 in the normal mode 501 and the narrowing mode 502. The normal mode 501 is a mode in which the scanning range of the LiDAR 101 is maximized in the specification of the LiDAR 101 and the irradiation density of the LiDAR 101 is minimized in the specification of the LiDAR 101. The narrowing mode 502 is a mode in which the scanning range of the LiDAR 101 is reduced more than in the normal mode 501, and the irradiation density of the LiDAR 101 is increased more than in the normal mode 501. The narrowing mode 502 may be a mode in which the scanning range of the LiDAR 101 is minimized in the specification of the LiDAR 101 and the irradiation density of the LiDAR 101 is maximized in the specification of the LiDAR 101. The object detection device 1 can detect a wide range of objects by scanning with the LiDAR 101 in the normal mode 501, and can detect a specific object in detail by scanning with the LiDAR 101 in the narrowing mode 502.

The LiDAR 101 maintains the normal mode 501 as it is when there is no caution-needed object among the detection objects as a result of scanning in the normal mode 501. As a result of scanning in the normal mode 501, when there is a caution-needed object in the detection object, the LiDAR 101 transitions to the narrowing mode 502. The caution-needed object is a detection object having low reliability and determined by the reliability determination unit 205 that the type of the object is unknown. The caution-needed object is registered in a caution-needed object list 503 by the reliability determination unit 205. The caution-needed object list 503 is a list in which information on detection objects to be scanned again in the narrowing mode 502 is stored. The caution-needed object list 503 is mounted in the memory 105 and is configured to hold point cloud data constituting the caution-needed object.

When the reliability of the caution-needed object rescanned in the narrowing mode 502 is high and the type of the object is determined by the reliability determination unit 205, the LiDAR 101 transitions to the normal mode 501. The caution-needed object of which the type is determined is excluded from the caution-needed object list 503 by the reliability determination unit 205. In a case where a predetermined time has elapsed since the transition from the normal mode 501 to the narrowing mode 502, the LiDAR 101 determines that a timeout has occurred and transitions to the normal mode 501.

That is, in the object detection device 1, the point cloud acquisition unit 201 causes the LiDAR 101 to perform scanning in the normal mode 501, and acquires the point cloud data according to the scanning result. In the object detection device 1, the object detection unit 204 detects an object on the basis of the acquired point cloud data. In the object detection device 1, when the reliability in the detection result of the object detection unit 204 is high (equal to or greater than the second reference value), the reliability determination unit 205 determines the type of the detection object. In the object detection device 1, when the reliability is low (equal to or greater than the first reference value and smaller than the second reference value), the reliability determination unit 205 registers the detection object in the caution-needed object list 503. In the object detection device 1, the point cloud acquisition unit 201 causes the LiDAR 101 to re-scan the detection object registered in the caution-needed object list 503 in the narrowing mode 502, and re-acquires the point cloud data according to the re-scanning result. In the object detection device 1, the object detection unit 204 re-detects the detection object on the basis of the re-acquired point cloud data. In the object detection device 1, the reliability determination unit 205 determines the reliability in the re-detection result of the object detection unit 204. In the object detection device 1, the reliability determination unit 205 excludes the detection object having high reliability in the re-detection result (the second reference value or more) from the caution-needed object list 503. Then, in the object detection device 1, the point cloud acquisition unit 201 causes the LiDAR 101 to scan the new object in the normal mode 501, and acquires the point cloud data according to the scanning result.

Figure 6:
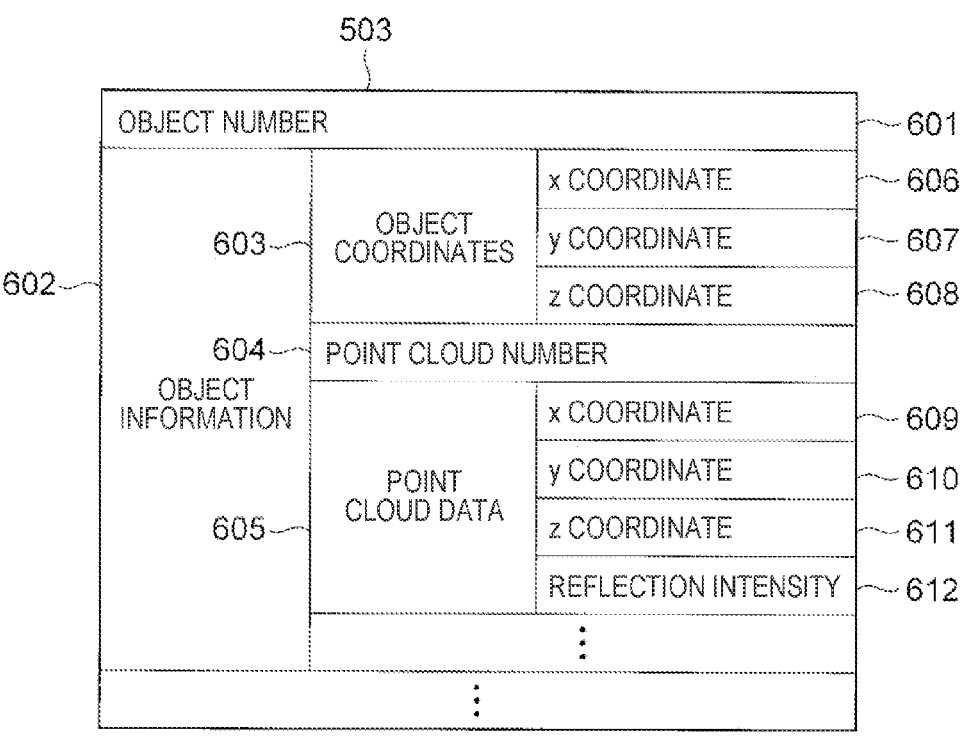
FIG. 6 is a diagram for explaining a data structure of a caution-needed object list illustrated in FIG. 5.

FIG. 6 is a diagram for explaining a data structure of the caution-needed object list 503 illustrated in FIG. 5.

The caution-needed object list 503 includes an object number 601 indicating the number of caution-needed objects and object information 602 indicating detailed information on the caution-needed objects. The caution-needed object list 503 has a structure in which the object information 602 is listed by the object number 601. The object information 602 includes object coordinates 603 indicating position coordinates of a caution-needed object, a point cloud number 604 indicating the number of pieces of point cloud data 605 constituting the caution-needed object, and each piece of the point cloud data 605 constituting the caution-needed object. The object coordinates 603 include an x coordinate

606, a y coordinate 607, and a z coordinate 608. Each piece of the point cloud data 605 includes an x coordinate 609, a y coordinate 610, a z coordinate 611, and a reflection intensity 612 of an individual three-dimensional point.

Figure 7:
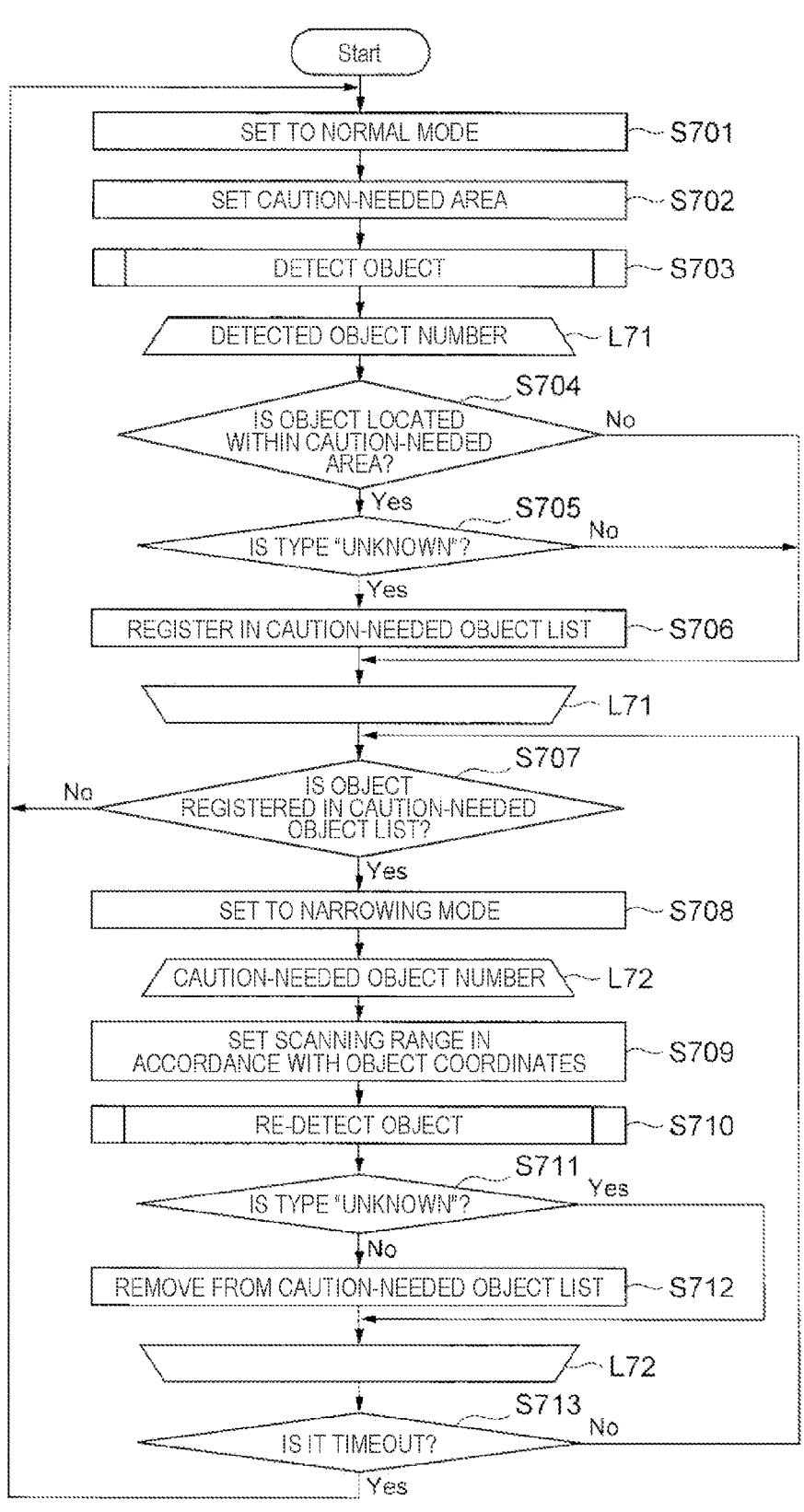
FIG. 7 is a flowchart illustrating a flow of processing performed by the object detection device illustrated in FIG. 2.

FIG. 7 is a flowchart illustrating a flow of processing performed by the object detection device 1 illustrated in FIG. 2.

In Step S701, the object detection device 1 sets the scanning mode of the LiDAR 101 to the normal mode 501.

In Step S702, the object detection device 1 sets the caution-needed area around the own vehicle based on the current vehicle speed of the own vehicle, the limit steering angle, and the predicted traveling direction. The caution-needed area is a monitoring area that the object detection device 1 should be particularly careful of in the scanning range of the LiDAR 101. The object located in the caution-needed area is an object that may be registered in the caution-needed object list as a caution-needed object. That is, the object located in the caution-needed area is an object that may be re-scanned in the narrowing mode as the caution-needed object. Setting of the caution-needed area will be described later with reference to FIG. 8. After setting the caution-needed area, the object detection device 1 scans the LiDAR 101 in the normal mode to acquire point cloud data of an object existing in the periphery of the own vehicle 301.

In Step S703, the object detection device 1 performs object detection processing of detecting an object on the basis of the acquired point cloud data. As an algorithm of the object detection processing, various algorithms such as an occupancy grid map (OGM) can be adopted. The object detection device 1 of the present embodiment performs the object detection processing using the occupancy grid map. The object detection processing will be described later with reference to FIG. 10.

After Step S703, the object detection device 1 proceeds to Loop L71. In Loop L71, the object detection device 1 performs Steps S704 to S706 by the number of detection objects to be detected in Step S703.

In Step S704, the object detection device 1 determines whether the detection object is located in the caution-needed area. When the detection object is not located in the caution-needed area, the object detection device 1 performs Loop L71 on another detection object. When the detection object is located in the caution-needed area, the object detection device 1 proceeds to Step S705.

In Step S705, the object detection device 1 determines whether it is determined that the type of the detection object is unknown. When it is not determined that the type of the detection object is unknown, the object detection device 1 performs Loop L71 on another detection object. In a case where it is determined that the type of the detection object is unknown, the object detection device 1 proceeds to Step S706.

In Step S706, the object detection device 1 registers the detection object of which the type is determined to be unknown in the caution-needed object list as a caution-needed object.

After Step S706, the object detection device 1 performs Loop L71 on another detection object. After performing Loop L71 by the number of detection objects, the object detection device 1 exits Loop L71 and proceeds to Step S707.

In Step S707, the object detection device 1 determines whether a caution-needed object is registered in the caution-needed object list. In a case where the caution-needed object is not registered in the caution-needed object list, the object detection device 1 proceeds to Step S701. In a case where a caution-needed object is registered in the caution-needed object list, the object detection device 1 proceeds to Step S708.

In Step S708, the object detection device 1 sets the scanning mode of the LiDAR 101 to the narrowing mode 502.

After Step S708, the object detection device 1 proceeds to Loop L72. In Loop L72, the object detection device 1 performs Steps S709 to S712 by the number of caution-needed objects, that is, by the number of detection objects registered as the caution-needed objects in the caution-needed object list.

In Step S709, the object detection device 1 sets the scanning range of the LiDAR 101 in accordance with the object coordinates of the caution-needed object. The object detection device 1 causes the LiDAR 101 to scan in the narrowing mode and reacquires the point cloud data of the caution-needed object. The setting of the scanning range of the LiDAR 101 in the narrowing mode will be described later with reference to FIGS. 9(a) and 9(b).

In Step S710, the object detection device 1 performs object detection processing on the basis of the re-acquired point cloud data. The algorithm of the object detection processing in Step S710 is similar to the algorithm of the object detection processing in Step S703. The object detection device 1 performs processing similar to that in Step S703.

In Step S711, the object detection device 1 determines whether it is determined that the type of the caution-needed object is unknown. in a case where it is determined that the type of the caution-needed object is unknown, the object detection device 1 performs Loop L72 on another caution-needed object. In a case where it is not determined that the type of the caution-needed object is unknown, the object detection device 1 proceeds to Step S712.

In Step S712, the object detection device 1 excludes the caution-needed object whose type is not determined to be unknown from the caution-needed object list.

After Step S712, the object detection device 1 performs Loop L72 on another caution-needed object. The object detection device 1 executes Loop L72 as many as the number of caution-needed objects, exits Loop L72, and proceeds to Step S713.

In Step S713, the object detection device 1 determines whether a timeout occurs. In a case where a predetermined time has elapsed after the narrowing mode is set in Step S708, the object detection device 1 determines that a timeout has occurred. In a case where the timeout has not occurred, the object detection device 1 proceeds to Step S707. In a case where the timeout has occurred, the object detection device 1 proceeds to Step S701.

Figure 8:
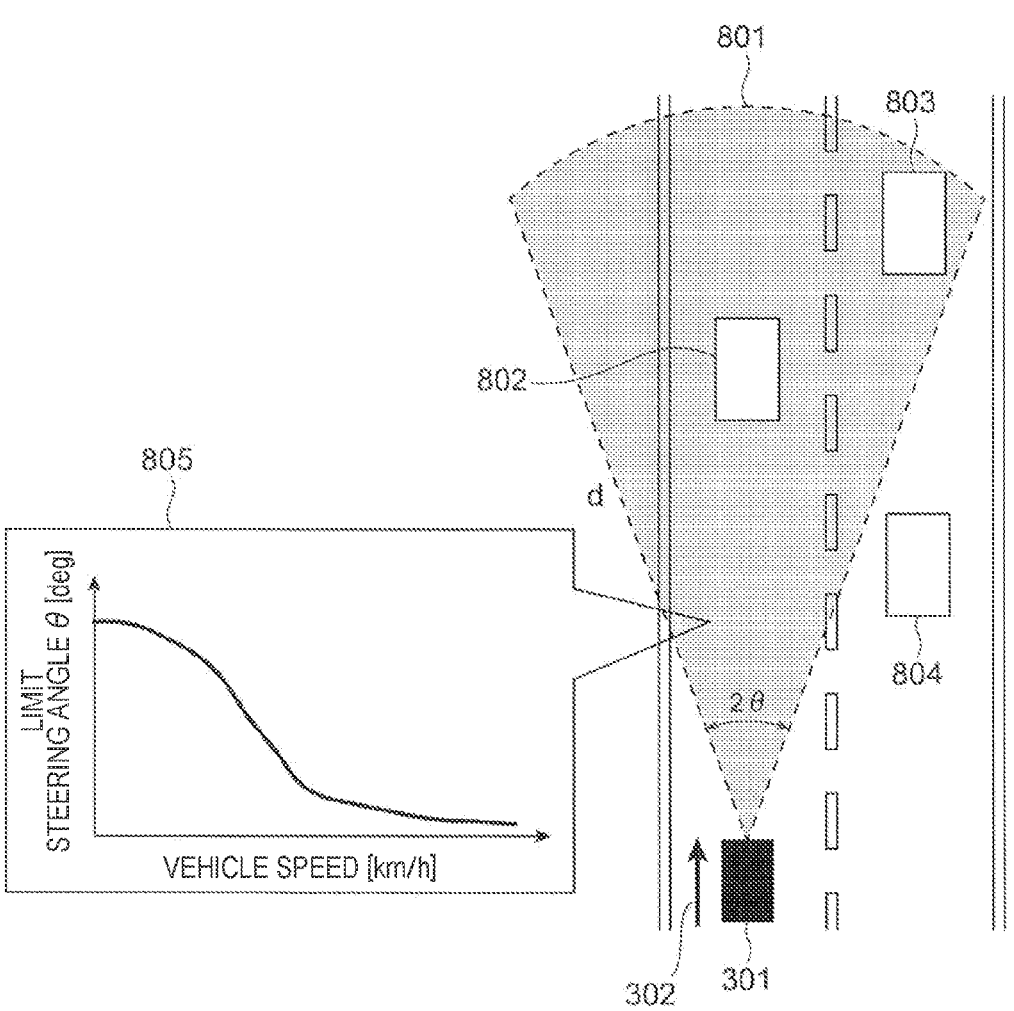
FIG. 8 is a diagram for explaining a caution-needed area illustrated in FIG. 7.
Figure 9:
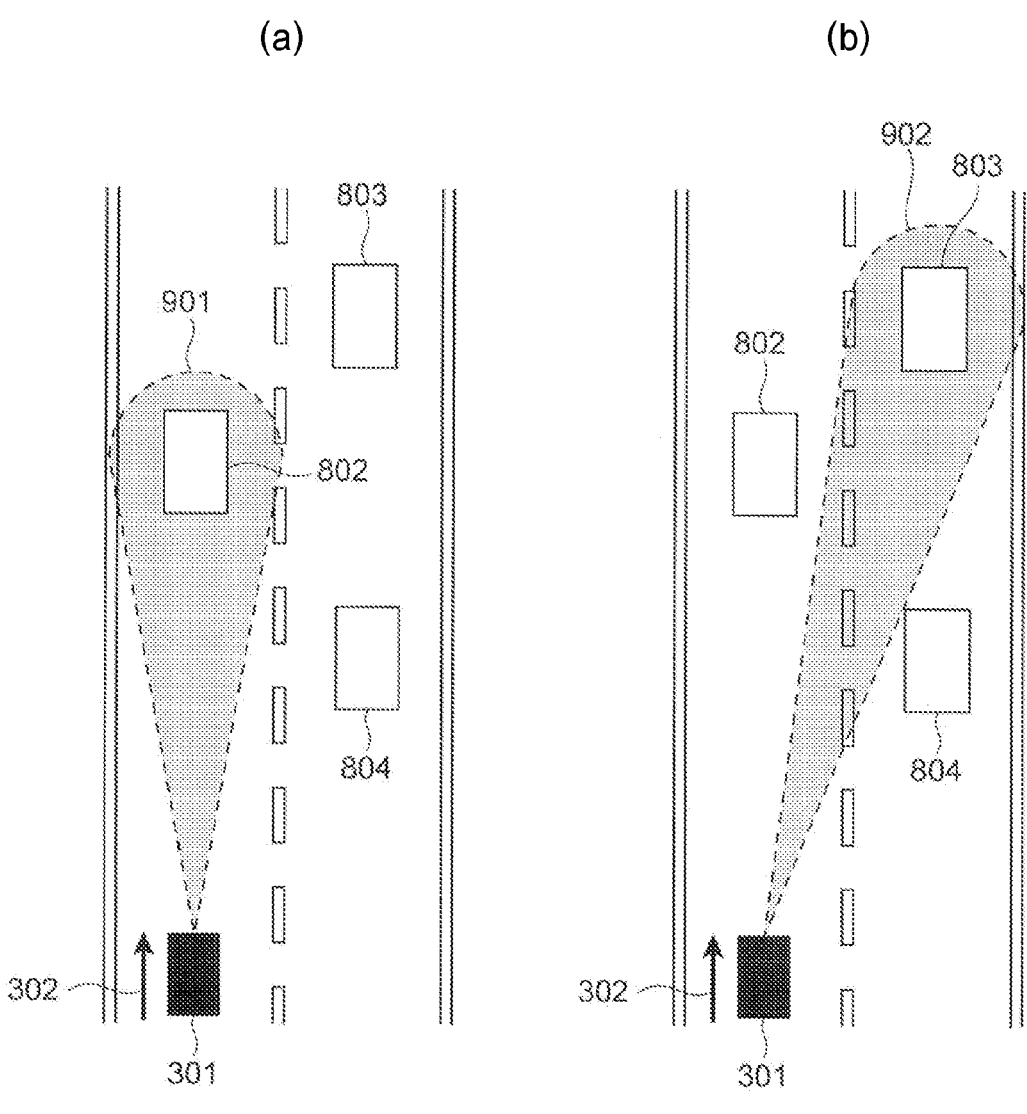
FIG. 9(a) is a diagram for explaining a case where a preceding vehicle becomes a scanning target in a narrowing mode from the situation illustrated in FIG. 8.
FIG. 9(b) is a diagram for explaining a case where another preceding vehicle becomes a scanning target in the narrowing mode from the situation illustrated in FIG. 8.

FIG. 8 is a diagram for explaining a caution-needed area 801 illustrated in FIG. 7. FIG. 9(a) is a diagram for explaining a case where a preceding vehicle 802 becomes a scanning target in the narrowing mode from the situation illustrated in FIG. 8. FIG. 9(b) is a diagram for explaining a case where another preceding vehicle 803 becomes a scanning target in the narrowing mode from the situation illustrated in FIG. 8.

The caution-needed area 801 is set based on the current vehicle speed and limit steering angle of the own vehicle 301, and a predicted traveling direction 302. The limit steering angle is a maximum steering angle at which the vehicle does not fall. The dynamic theoretical value of the limit steering angle is described in, for example, Wada et al., "Study on steering control by joystick-type automobile driving device" (Journal of the Society of Instrument and Control Engineers Vol. 49, No. 4, 417/424, 2013). This document describes the finding that the limit steering angle decreases as the vehicle speed increases. The limit steering angle changes as indicated by 805. The object detection device 1 stores a table or the like indicating the relationship between the vehicle speed of the own vehicle 301 and the limit steering angle in the storage device 103 or the memory 105 in advance.

The object detection device 1 specifies the limit steering angle corresponding to the current vehicle speed of the own vehicle 301 by referring to a table indicating the relationship between the vehicle speed and the limit steering angle. Here, the limit steering angle is θ, and the longest distance that the LiDAR 101 can measure is d. The object detection device 1 sets, as the caution-needed area 801, a fan-shaped area centered on the own vehicle 301, having a radius of d and a central angle of 2θ, and extending forward in the traveling direction that is the predicted traveling direction 302 of the own vehicle 301.

In the example of FIG. 8, the preceding vehicle 802 and the preceding vehicle 803 of the own vehicle 301 are located inside the caution-needed area 801, but a preceding vehicle 804 is located outside the caution-needed area 801. When it is determined that the types of the preceding vehicle 802 and the preceding vehicle 803 are unknown, the object detection device 1 registers the preceding vehicle 802 and the preceding vehicle 803 as caution-needed objects in the caution-needed object list, and performs re-scanning in the narrowing mode. Even when it is determined that the type of the preceding vehicle 804 is unknown, the object detection device 1 does not register the preceding vehicle 804 in the caution-needed object list and does not perform re-scanning in the narrowing mode. That is, the preceding vehicle 802 and the preceding vehicle 803 located inside the caution-needed area 801 can be scanning targets in the narrowing mode, but the preceding vehicle 804 located outside the caution-needed area 801 is not a scanning target in the narrowing mode.

FIG. 9(a) illustrates a case where the preceding vehicle 802 becomes a scanning target in the narrowing mode. In this case, the object detection device 1 sets a scanning range 901 of the LiDAR 101 in the narrowing mode in accordance with the object coordinates of the preceding vehicle 802. The object detection device 1 causes the LiDAR 101 to scan in the set scanning range 901 to acquire the point cloud data of the preceding vehicle 802. FIG. 9(b) illustrates a case where the preceding vehicle 803 becomes a scanning target in the narrowing mode. In this case, the object detection device 1 sets a scanning range 902 of the LiDAR 101 in the narrowing mode in accordance with the object coordinates of the preceding vehicle 803. The object detection device 1 causes the LiDAR 101 to scan in the set scanning range 902 to acquire the point cloud data of the preceding vehicle 803.

Figure 10:
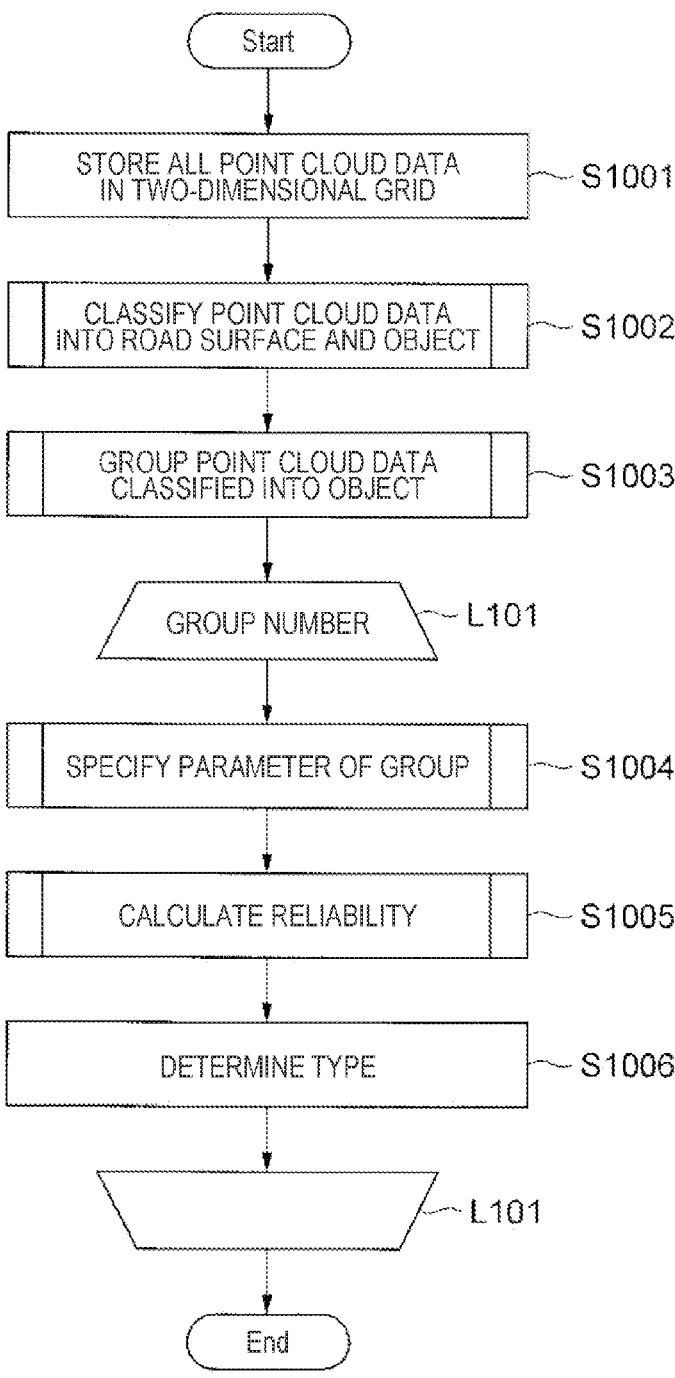
FIG. 10 is a flowchart illustrating a flow of object detection processing shown in Step S703 and Step S710 of FIG. 7.

FIG. 10 is a flowchart illustrating a flow of the object detection processing illustrated in Step S703 and Step S710 of FIG. 7.

In Step S1001, the object detection device 1 stores the all point cloud data in each two-dimensional grid constituting the occupancy grid map. In the object detection device 1, in order to implement the object detection function by a processing flow that does not depend on the type of the LiDAR 101, a coordinate system that does not depend on the type of the LiDAR 101 is required. Therefore, it is effective to use the occupancy grid map. The size of the grid can be arbitrarily determined according to the size of the object to be detected.

In Step S1002, the object detection device 1 classifies the point cloud data into the road surface and the object. Specifically, the object detection device 1 estimates the road surface in the occupancy grid map, and determines the point cloud data constituting the estimated road surface. The object detection device 1 determines the point cloud data constituting the object from the point cloud data other than the point cloud data constituting the road surface. As a result, the object detection device 1 can classify the point cloud data into the road surface and the object. The object detection device 1 determines that the point cloud data of which of the road surface and the object is unknown is unknown. Details of the processing related to the road surface estimation and the classification of the point cloud data will be described later with reference to FIG. 13.

In Step S1003, the object detection device 1 groups the point cloud data classified as the object. Specifically, in the point cloud data classified as the object in Step S1002, the object detection device 1 groups the adjacent point cloud data whose positions are arranged within a predetermined distance to create a group. The group represents a detection object. Details of processing related to grouping will be described later with reference to FIG. 14.

After Step S1003, the object detection device 1 proceeds to Loop L101. In Loop L101, the object detection device 1 performs Steps S1004 to S1006 by the number of groups created by grouping in Step S1003.

In Step S1004, the object detection device 1 specifies parameters of the group. The parameters of the group are the depth, width and height of the group. The parameters of the group may include position coordinates of the group. The parameters of the group represent parameters of the detection object. Details of the processing related to the specification of the parameters of the group will be described later with reference to FIG. 16.

In Step S1005, the object detection device 1 calculates the reliability for each type of detection object on the basis of the parameter of the group. Processing related to calculation of the reliability will be described later with reference to FIG. 17.

In Step S1006, the object detection device 1 determines the type of the detection object on the basis of the calculated reliability for each type. As described above, when the reliability of a certain type is smaller than the first reference value (for example, 0.3), the object detection device 1 denies the certain type as the type of the detection object. When the reliability of a certain type is greater than or equal to a second reference value (for example, 0.6), the score calculation unit 206 determines the certain type as the type of the detection object. When the reliability of a certain type is equal to or greater than the first reference value and smaller than the second reference value, the score calculation unit 206 does not deny or confirm the certain type as the type of the detection object, and determines that the type of the detection object is unknown.

After Step S1006, the object detection device 1 performs Loop L101 for another group. After performing Loop L101 by the number of groups, the object detection device 1 exits Loop L101 and ends the processing illustrated in FIG. 10.

Figure 11:
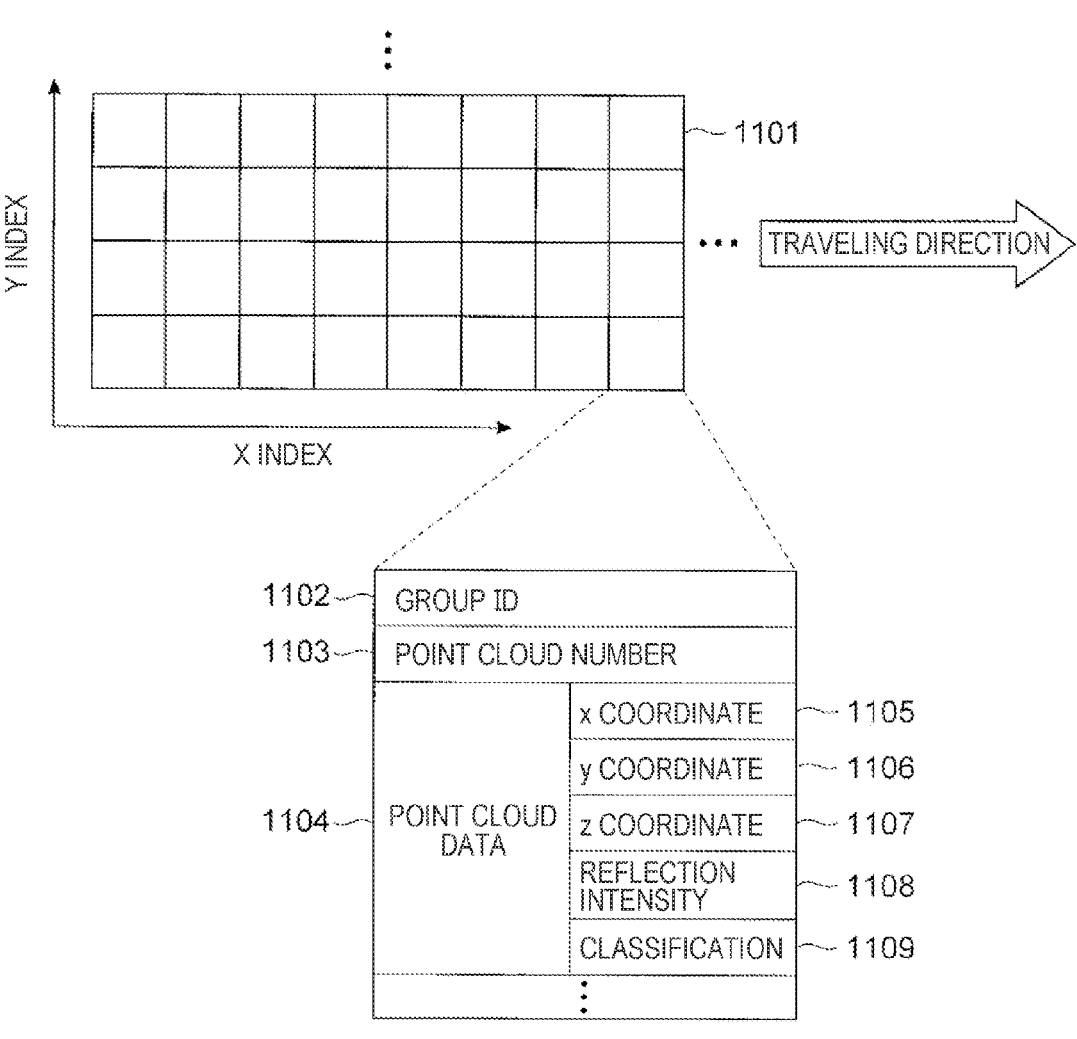
FIG. 11 is a diagram for explaining an occupancy grid map used for the object detection processing illustrated in FIG. 10.

FIG. 11 is a diagram for explaining an occupancy grid map used for the object detection processing illustrated in FIG. 10.

Similarly to FIG. 3, an occupancy grid map 1101 has a coordinate system in which a direction along the traveling direction of the own vehicle is an X index and a direction along the vehicle width direction of the own vehicle is a Y index. In the occupancy grid map 1101, each grid has a predetermined same size. Each grid holds data including point cloud data 1104. As illustrated in FIG. 11, the data held by each of the grids includes a group ID 1102 which is identification information of the group, a point cloud number 1103 indicating the number of point cloud data 1104 constituting the group, and each of the point cloud data 1104 constituting the group. Each of the point cloud data 1104 includes an x coordinate 1105, a y coordinate 1106, a z coordinate 1107, a reflection intensity 1108, and a classification 1109 for an individual three-dimensional point. The classification 1109 indicates whether the point cloud data is classified as an object, a road surface, or the classification is unknown.

Figure 12:
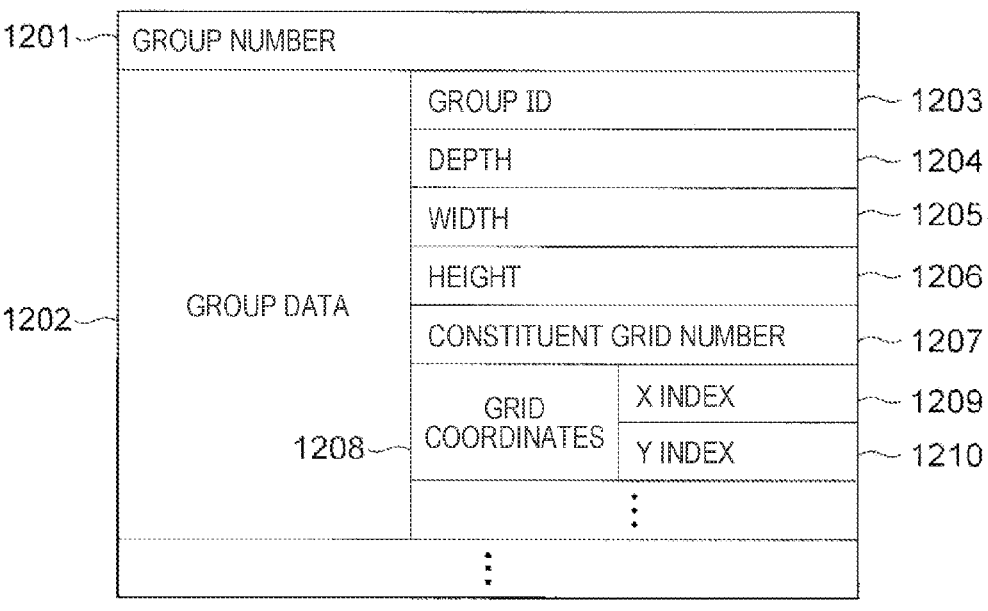
FIG. 12 is a diagram for explaining a data structure of a group created in the object detection processing illustrated in FIG. 10.

FIG. 12 is a diagram for explaining a data structure of a group created in the object detection processing illustrated in FIG. 10.

The data of the group created in Step S1003 of FIG. 10 includes the group number 1201 indicating the number of pieces of group data 1202 and each piece of group data 1202. Each piece of group data 1202 includes a group ID 1203, a depth 1204, a width 1205, and a height 1206 which are parameters of the group, a constituent grid number 1207 indicating the number of grids constituting the group, and grid coordinates 1208 indicating coordinates of individual grid constituting the group. The grid coordinates 1208 include an X index 1209 and a Y index 1210.

Figure 13:
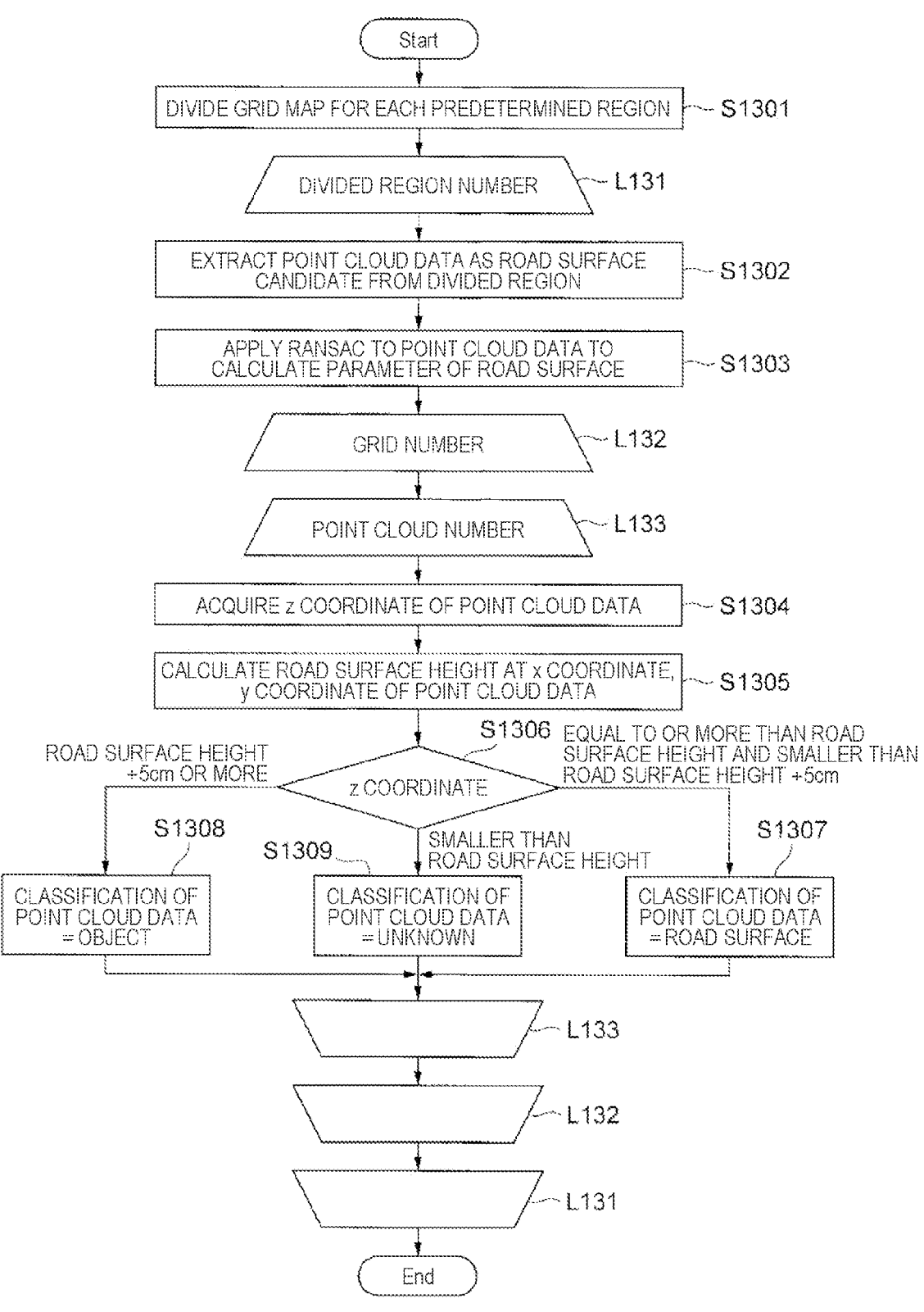
FIG. 13 is a flowchart illustrating a flow of processing related to road surface estimation and point cloud data classification illustrated in Step S1002 of FIG. 10.

FIG. 13 is a flowchart illustrating a flow of processing related to road surface estimation and point cloud data classification illustrated in Step S1002 of FIG. 10.

In Step S1301, the object detection device 1 divides the occupancy grid map into a plurality of regions for each predetermined region. Since the road surface indicated by the entire occupancy grid map is not necessarily constituted by one plane, it is appropriate to express the road surface by a combination of several planes. The object detection device 1 divides the occupancy grid map into a plurality of regions, and estimates the road surface by a combination of local features. In the present embodiment, each of a plurality of regions obtained by dividing the occupancy grid map for each predetermined region is also referred to as a "divided region".

After Step S1301, the object detection device 1 proceeds to Loop L131. In Loop L131, the object detection device 1 performs Steps S1302 and S1303, and Loop L132 by the number of divided regions indicating the number of the plurality of regions divided in Step S1301.

In Step S1302, the object detection device 1 extracts point cloud data as a road surface candidate in the divided region to be processed. For example, in a case where the z coordinate of the point cloud data held in each grid in the divided region to be processed is within a range of ±10 cm of the road surface height of the divided region closer to the own vehicle than the divided region, the object detection device 1 extracts the point cloud data as the point cloud data as the road surface candidate. However, when the divided region to be processed is the divided region closest to the own vehicle, the object detection device 1 extracts the point cloud data as the point cloud data as the road surface candidate when the z coordinate of the point cloud data held in each grid in the divided region to be processed is within the range of ±10 cm of the z coordinate (the z coordinate of the origin) of the own vehicle.

In Step S1303, the object detection device 1 applies random sample consensus (RANSAC), which is one of robust estimation, to the extracted point cloud data to calculate the road surface parameter. For example, when the road surface is regarded as a plane, the z coordinate of the point cloud data can be represented by the following Expression (1).

$$z=ax+by+c \quad (1)$$

The object detection device 1 calculates the values of the coefficients a, b, and c in Expression (1) using RANSAC. The road surface parameter is coefficients a, b, and c of Expression (1). The object detection device 1 may apply a least squares method instead of RANSAC to the extracted point cloud data, or may apply a combination of RANSAC and a least squares method.

After Step S1303, the object detection device 1 proceeds to Loop L132 to classify all the point cloud data in the divided region to be processed into the road surface and the object. In Loop L132, the object detection device 1 performs Loop L133 by the number of grids in the divided region to be processed. In Loop L133, the object detection device 1 performs Steps S1304 to S1309 by the number of point groups that is the number of point cloud data held in each grid.

In Step S1304, the object detection device 1 acquires the z coordinate (for example, the z coordinate 1107 in FIG. 11) of the point cloud data held in the grid in the divided region to be processed.

In Step S1305, the object detection device 1 calculates the road surface height indicated by the x coordinate and the y coordinate of the point cloud data of which the z coordinate is acquired in Step S1304. Specifically, the object detection device 1 calculates the road surface height from the coefficients a, b, and c (road surface parameters) calculated in Step S1303 by using the following Expression (2).

$$\text{Road surface height}=a\times(x \text{ coordinate})+b\times(y \text{ coordinate})+c \quad (2)$$

In Step S1306, the object detection device 1 compares the z coordinate acquired in Step S1304 with the road surface height calculated in Step S1305. In a case where the acquired z coordinate is equal to or higher than the road surface height and is in a range smaller than the road surface height+5 cm, the object detection device 1 proceeds to Step S1307. When the acquired z coordinate is greater than or equal to the road surface height+5 cm, the object detection device 1 proceeds to Step S1308. When the acquired z coordinate is smaller than the road surface height, the object detection device 1 proceeds to Step S1309.

In Step S1307, the object detection device 1 determines that the classification of the point cloud data of which the z coordinate is acquired in Step S1304 is the road surface.

In Step S1308, the object detection device 1 determines that the classification of the point cloud data of which the z coordinate is acquired in Step S1304 is the object.

In Step S1309, the object detection device 1 determines that the classification of the point cloud data of which the z coordinate is acquired in Step S1304 is unknown.

After Step S1307, Step S1308, or Step S1309, the object detection device 1 performs Loop L133 on another piece of point cloud data held in the grid in the divided region to be processed. After performing Loop L133 by the number of pieces of point cloud data held in the grid, the object detection device 1 exits Loop L133 and performs Loop L132 on another grid in the divided region. After performing Loop L132 by the number of grids in the divided region, the object detection device 1 exits Loop L132 and performs Loop L131 on another divided region. After performing Loop L131 by the number of divided regions, the object detection device 1 exits Loop L131 and ends the processing illustrated in FIG. 13.

Figure 14:
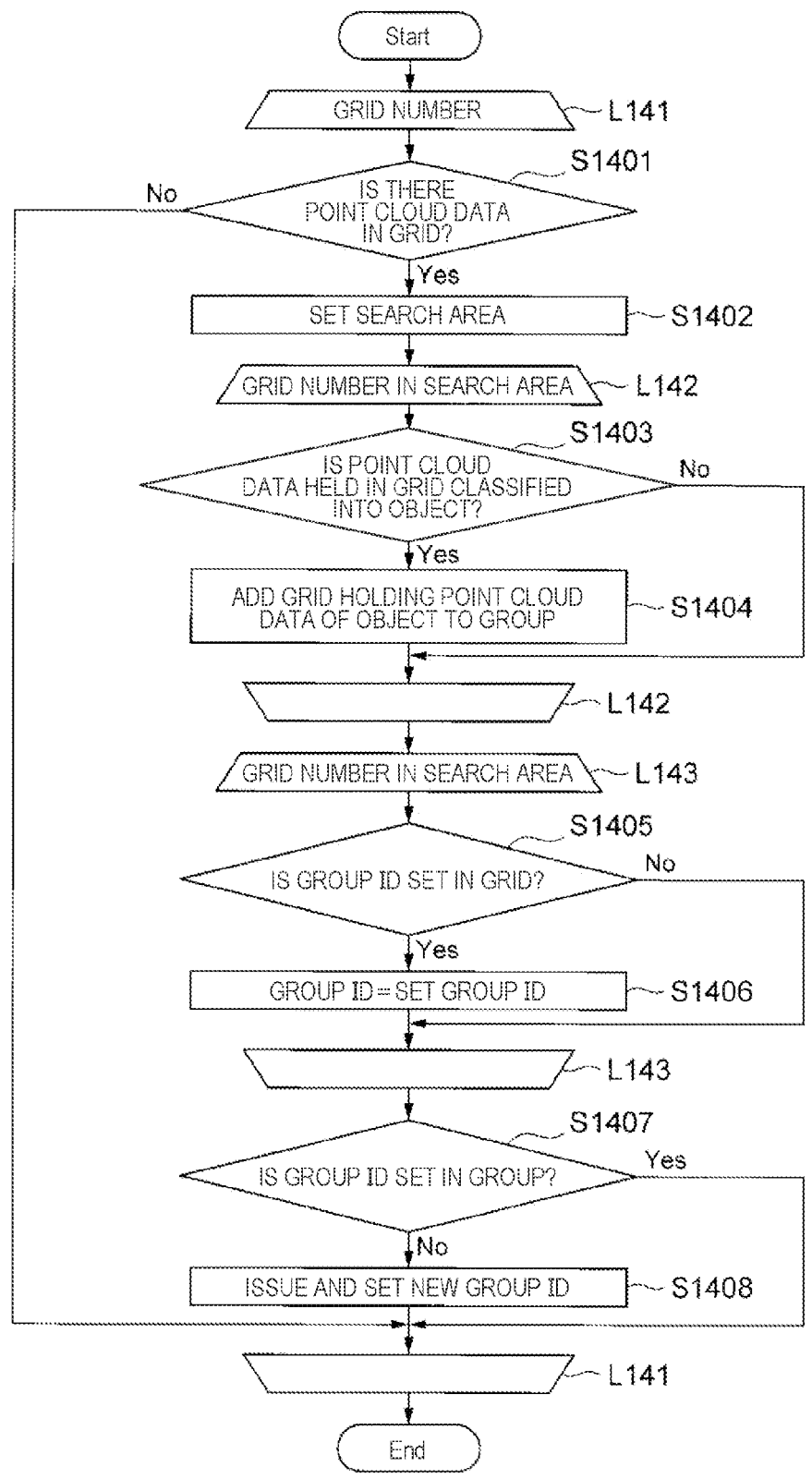
FIG. 14 is a flowchart illustrating a flow of processing related to grouping illustrated in Step S1003 of FIG. 10.

FIG. 14 is a flowchart illustrating a flow of processing related to grouping illustrated in Step S1003 of FIG. 10.

The object detection device 1 performs Loop L141 for performing Steps S1401 to S1408 by the number of grids of the occupancy grid map.

In Step S1401, the object detection device 1 determines whether the point cloud data is held in the grid to be processed. In a case where the point cloud data is not held in the grid, the object detection device 1 performs Loop L141 on another grid. In a case where the point cloud data is held in the grid, the object detection device 1 proceeds to Step S1402.

In Step S1402, the object detection device 1 sets a search area around a grid to be processed. The search area is an area set in the occupancy grid map for searching grids constituting the same group. The size of the search area is a predetermined size.

After Step S1402, the object detection device 1 proceeds to Loop L142 in order to extract the point cloud data classified as the object in the search area and put together as a group. In Loop L142, the object detection device 1 performs Steps S1403 and S1404 by the number of grids in the set search area.

In Step S1403, the object detection device 1 determines whether the classification of the point cloud data held in the grid in the set search area is an object. When the classification of the point cloud data is not an object, the object detection device 1 performs Loop L142 on another grid in the search area. In a case where the classification of the point cloud data is an object, the object detection device 1 proceeds to Step S1404.

In Step S1404, the object detection device 1 adds a grid holding the point cloud data determined to be classified as an object in Step S1403 to the group to which the set search area belongs.

After Step S1404, the object detection device 1 performs Loop L142 on another grid in the set search area. After performing Loop L142 by the number of grids in the search area, the object detection device 1 exits Loop L142 and proceeds to Loop L143. The object detection device 1 performs Loop L143 to set a group ID to a group in the set search area. In Loop L143, the object detection device 1 performs Steps S1405 and S1406 by the number of grids in the search area.

In Step S1405, the object detection device 1 determines whether a group ID is set to a grid in the set search area. When the group ID is not set to the grid, the object detection device 1 performs Loop L143 on another grid in the search area. In a case where the group ID is set in the grid, the object detection device 1 proceeds to Step S1406.

In Step S1406, the object detection device 1 sets the group ID already set in the grid as it is.

After Step S1406, the object detection device 1 performs Loop L143 on another grid in the set search area. After performing Loop L143 by the number of grids in the search area, the object detection device 1 exits Loop L143 and proceeds to Step S1407.

In Step S1407, the object detection device 1 determines whether the group ID is set to the group to which the set search area belongs. When the group ID is set to the group, the object detection device 1 performs Loop L141 on another grid of the occupancy grid map. In a case where the group ID is not set to the group, the object detection device 1 proceeds to Step S1408.

In Step S1408, the object detection device 1 newly issues a group ID, and sets the newly issued group ID to the group to which the set search area belongs.

After Step S1408, the object detection device 1 performs Loop L141 on another grid of the occupancy grid map. After performing Loop L141 by the number of grids, the object detection device 1 exits Loop L141 and ends the processing illustrated in FIG. 14.

FIG. 15(a) is a diagram for explaining the processing of FIG. 14, and is a diagram illustrating a grouping situation in a case where the object detection device 1 sets a search area 1501 for the first time. FIG. 15(b) is a diagram illustrating a grouping situation in a case where the processing proceeds from FIG. 15(a).

Figure 15:
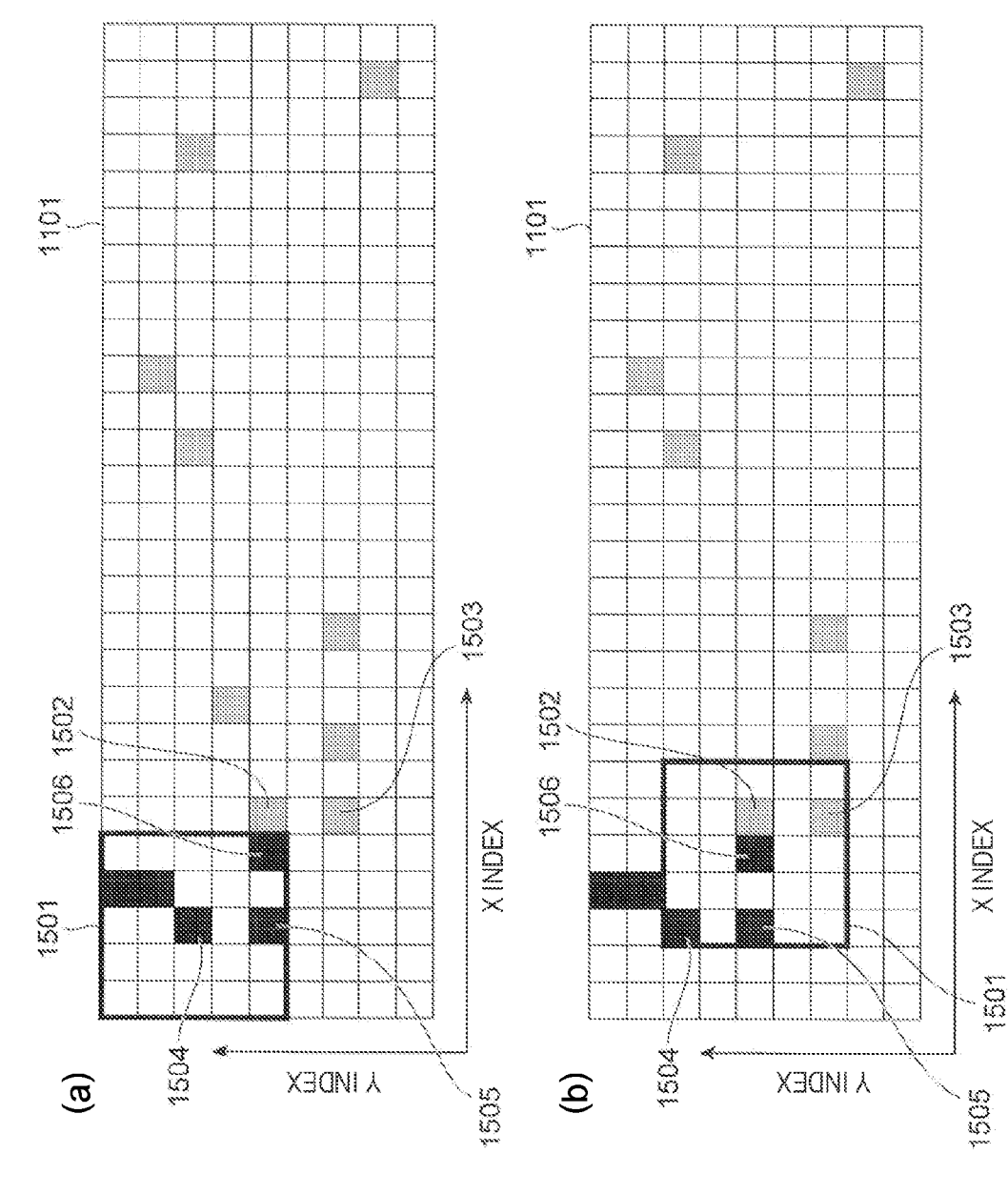
FIG. 15(a) is a diagram for explaining the processing of FIG. 14, and is a diagram illustrating a grouping situation in a case where the object detection device sets a search area for the first time.
FIG. 15(b) is a diagram illustrating a grouping situation in a case where the processing proceeds from FIG. 15(a).

In FIGS. 15 (a) and 15(b), a black or gray grid is a grid that holds point cloud data classified as an object. A black grid indicates a grid in which the group ID is set, and a gray grid indicates a grid in which the group ID is not set.

In the example of FIG. 15(a), the object detection device 1 sets the search area 1501 around a grid 1504. The object detection device 1 sets the group ID as the same group for the black grid in the search area 1501 including the grid 1504, a grid 1505, and a grid 1506. Thereafter, it is assumed that the object detection device 1 performs grouping by moving the search area 1501 by one grid from the situation of FIG. 15(a), and sets the search area 1501 around the grid 1506 as illustrated in FIG. 15(b).

In the example of FIG. 15(b), a group ID has already been set as the same group for the grid 1504, the grid 1505, and the grid 1506 in the search area 1501. For a grid 1502 and a grid 1503 in the search area 1501, the group is not determined, and the group ID is not set. In the situation as illustrated in FIG. 15(b), the object detection device 1 sets the already set group ID as it is for the grid 1504, the grid 1505, and the grid 1506 in the search area 1501. The object detection device 1 adds the grid 1502 and the grid 1503 in the search area 1501 to a group including the grid 1504 and the like, and the group ID set in the grid 1504 and the like is set.

Figure 16:
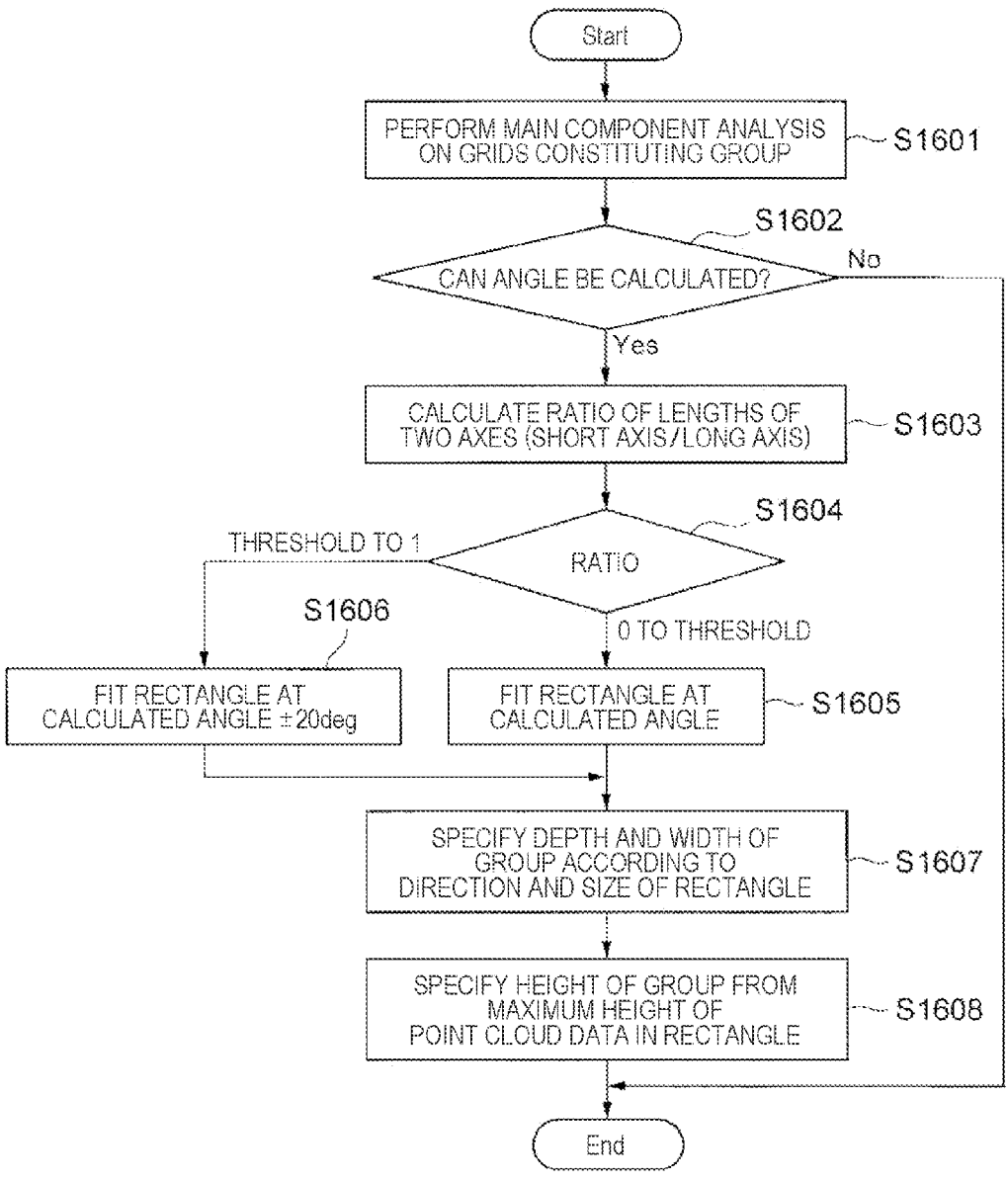
FIG. 16 is a flowchart illustrating a flow of processing related to specification of a parameter of a group illustrated in Step S1004 of FIG. 10.

FIG. 16 is a flowchart illustrating a flow of processing related to the specification of the parameters of the group illustrated in Step S1004 of FIG. 10. The processing illustrated in FIG. 16 is processing performed to specify parameters of one group.

In Step S1601, the object detection device 1 performs main component analysis on the grids constituting the group. That is, the object detection device 1 analyzes the distribution tendency of the grid and specifies the main component axis that can appropriately express the direction of the group. Specifically, the object detection device 1 specifies a first main component axis and a second main component axis as the main component axes, and calculates the angles of the first main component axis and the second main component axis with respect to the X index and the Y index constituting the coordinate system of the occupancy grid map 1101.

In Step S1602, the object detection device 1 determines whether the angle of the main component axis with respect to the X index and the Y index has been calculated. When the object detection device 1 cannot calculate the angle, the object detection device 1 ends the processing illustrated in FIG. 16. When the angle can be calculated, the object detection device 1 proceeds to Step S1603.

In Step S1603, the object detection device 1 calculates the ratio of the length of the second main component axis to the length of the first main component axis. The first main component axis is longer than the second main component axis. The first main component axis and the second main component axis can be considered to correspond to a long axis and a short axis of an ellipse surrounding the grid. The object detection device 1 calculates the ratio of the length of the short axis (second main component axis) to the length of the long axis (first main component axis). The numerical range of the ratio is more than 0.0 and 1.0 or less. The smaller the ratio, the higher the reliability of the angle calculated in Step S1601.

In Step S1604, the object detection device 1 compares the ratio of the length of the second main component axis to the length of the first main component axis with a predetermined threshold. The threshold is a value that ensures the reliability of the angle calculated in Step S1601. In a case where the ratio is larger than the threshold and equal to or smaller than 1.0, the object detection device 1 proceeds to Step S1606. In a case where the ratio is larger than 0.0 and equal to or smaller than the threshold, the object detection device 1 proceeds to Step S1605.

In Step S1605, the object detection device 1 fits the rectangle to the grid at the angle calculated in Step S1601. The angle of the fitted rectangle specifies the direction of the rectangle. The length of the long side and the length of the short side of the fitted rectangle specify the size of the rectangle. The length of the long side and the length of the short side of the fitted rectangle correspond to the length of the long axis (first main component axis) and the length of the short axis (second main component axis). After Step S1605, the object detection device 1 proceeds to Step S1607.

In Step S1606, the object detection device 1 fits the rectangle to the grid while rotating the rectangle in the range of ±20 deg of the angle calculated in Step S1601. At this time, the object detection device 1 performs fitting at a rotation angle at which the number of grids included in the rectangle is maximum. This method is a method called Search Based Rectangle Fitting (SBRF). The rectangular rotation angle range is not necessarily limited to the range of ±20 deg of the angle calculated in Step S1601, and can be arbitrarily determined.

In Step S1607, the object detection device 1 specifies the depth and the width of the group according to the direction and the size of the fitted rectangle. Specifically, the object detection device 1 specifies, as the depth of the group, one of the long side and the short side of the fitted rectangle having a smaller angle formed with the traveling direction of the own vehicle, and specifies the other as the width of the group.

In Step S1608, the object detection device 1 specifies the maximum height of the point cloud data held by the grid in the fitted rectangle, and specifies the maximum height as the height of the group. After Step S1608, the object detection device 1 ends the processing illustrated in FIG. 16.

Figure 17:
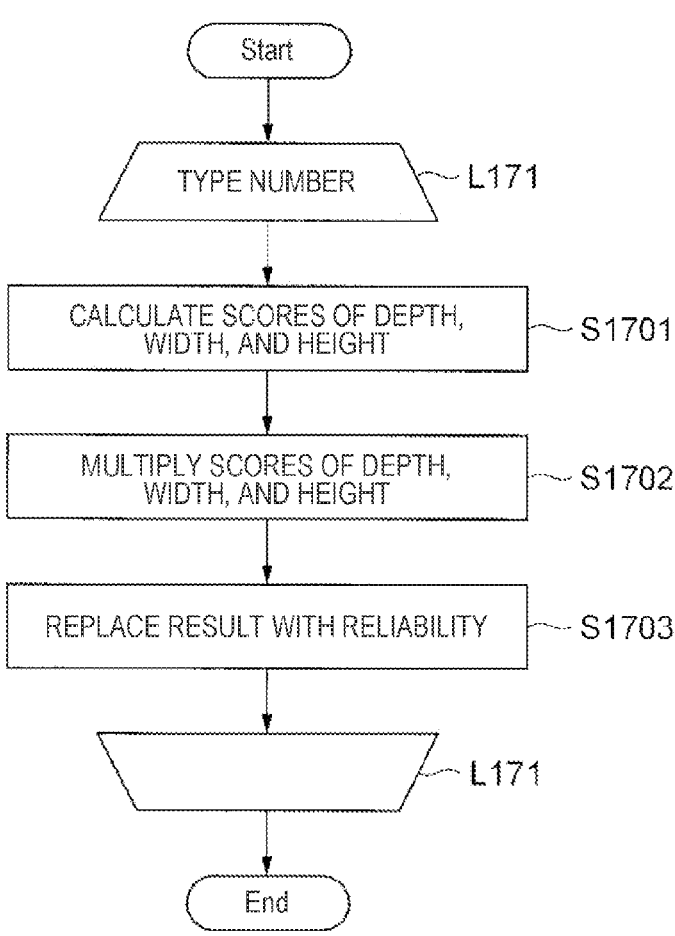
FIG. 17 is a flowchart illustrating a flow of processing related to calculation of reliability illustrated in Step S1005 of FIG. 10.

FIG. 17 is a flowchart illustrating a flow of processing related to the calculation of the reliability illustrated in Step S1005 of FIG. 10. The processing illustrated in FIG. 17 is processing performed to calculate reliability for each type of detection object represented by one group.

The object detection device 1 performs Loop L171 in which Steps S1701 to S1703 are performed by the number of types of objects predetermined as calculation targets of the reliability.

In Step S1701, the object detection device 1 calculates scores of the depth, the width, and the height which are parameters of the group. That is, the object detection device 1 calculates scores of the depth, the width, and the height which are parameters of the detection object represented by the group. A score calculation method and a calculation example will be described later with reference to FIGS. 18 to 20.

In Step S1702, the object detection device 1 multiplies the scores of the depth, the width, and the height which are parameters of the group. That is, the object detection device 1 multiplies the respective scores of the depth, the width, and the height which are parameters of the detection object represented by the group. As a result, the product of the scores of the depth, the width, and the height is calculated.

In Step S1703, the object detection device 1 replaces the calculation result of Step S1702 with the reliability. The reliability obtained in Step S1703 indicates how much the type of the detection object represented by the group matches the type of the processing target. A calculation example of the reliability will be described later with reference to FIGS. 19 and 20.

After Step S1703, the object detection device 1 performs Loop L171 for another type. After performing Loop L171 by the number of types, the object detection device 1 exits Loop L171 and ends the processing illustrated in FIG. 17.

Figure 18:
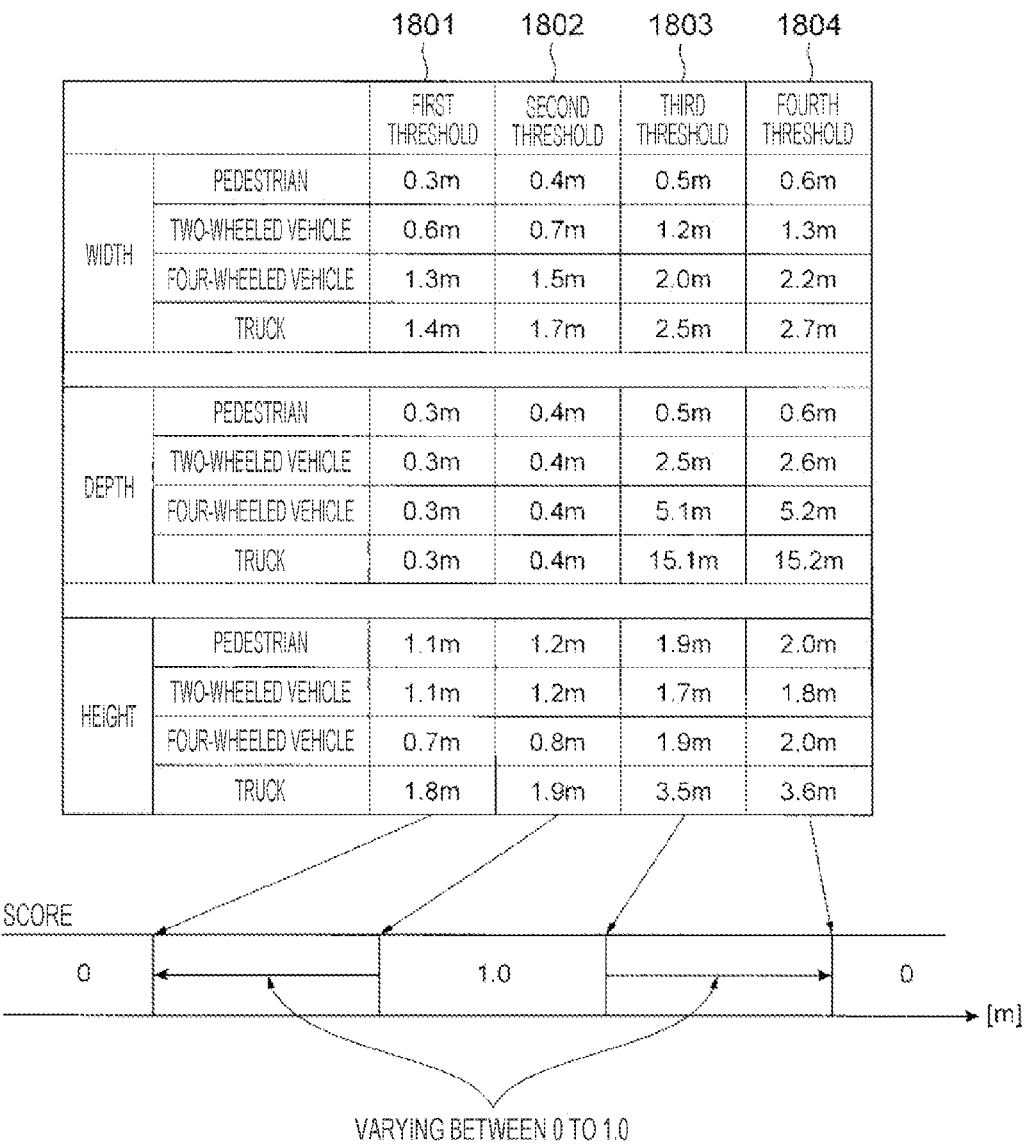
FIG. 18 is a diagram for explaining a score calculation method illustrated in Step S1701 of FIG. 17.
Figure 19:
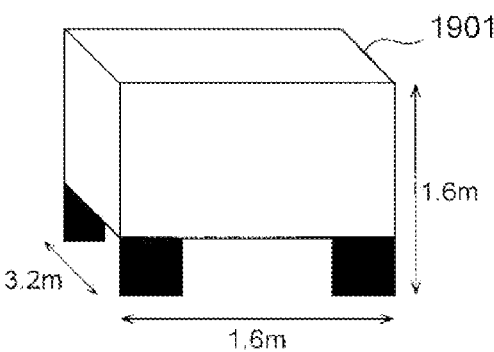
FIG. 19 is a diagram for explaining a calculation example of a score and a reliability using FIG. 18.
Figure 19:
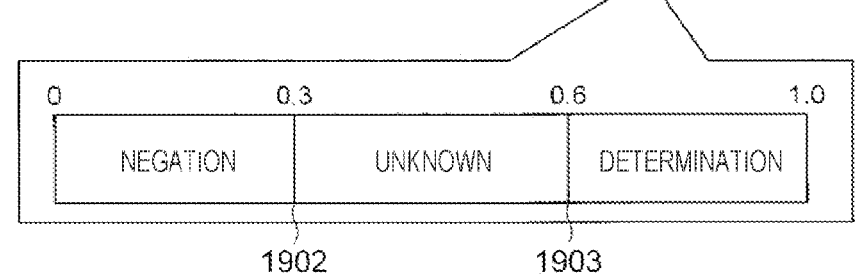
Figure 20:
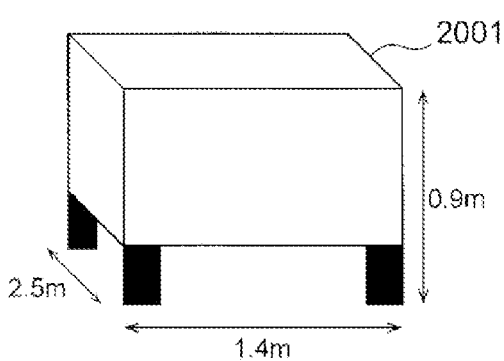
FIG. 20 is a diagram for explaining another calculation example of a score and a reliability different from those in FIG. 19.
Figure 20:
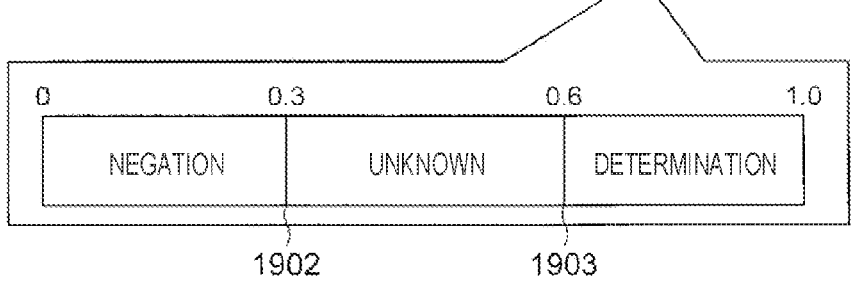

A method of calculating the score and the reliability will be described with reference to FIGS. 18 to 20. FIG. 18 is a diagram for explaining a score calculation method shown in Step S1701 of FIG. 17. FIG. 19 is a diagram for explaining a calculation example of the score and the reliability using FIG. 18. FIG. 20 is a diagram for explaining another calculation example of the score and the reliability different from those in FIG. 19.

In FIG. 18, a first threshold 1801 to a fourth threshold 1804 for calculating the scores of the depth, the width, and the height, which are parameters of the detection object, are described for each predetermined object type. FIG. 18 illustrates an example in which four types of objects, that is, a pedestrian, a two-wheeled vehicle, a four-wheeled vehicle, and a truck are determined in advance as the types of objects, but the types are not limited to these four types.

When the parameter of the detection object is smaller than the first threshold 1801 or larger than the fourth threshold 1804, the object detection device 1 sets the score of the parameter to substantially 0.0 (for example, 0.01). For example, in the case that the depth of the detection object is 0.1 m, the object detection device 1 sets the score to substantially 0 (for example, 0.01) because the depth is smaller than 0.3 m that is the first threshold 1801. The reason why the score is set to substantially 0.0 instead of 0.0 is that the product of the scores of the depth, the width, and the height is set as the reliability.

When the parameter of the detection object falls within the range from the second threshold 1802 to the third threshold 1803, the object detection device 1 sets the score of the parameter to 1.0. A range from the second threshold 1802 to the third threshold 1803 indicates a range that can be taken by the parameter of the detection object.

When the parameter of the detection object is within the range from the first threshold 1801 to the second threshold 1802, the object detection device 1 calculates the score according to the value of the parameter. Specifically, the object detection device 1 calculates the score in this case using the following Expression (3).

$$\text{Score}=(\text{Parameter value}-\text{First threshold 1801})/(\text{Second threshold 1802}-\text{First threshold 1801}) \qquad (3)$$

That is, the object detection device 1 calculates the score in this case by proportional calculation of the difference between the parameter value and the first threshold 1801 and the difference between the second threshold 1802 and the first threshold 1801. The score varies between 0.0 and 1.0.

Similarly, when the parameter of the detection object is within a range larger than the third threshold 1803 and equal to or smaller than the fourth threshold 1804, the object detection device 1 calculates the score according to the value of the parameter. Specifically, the object detection device 1 calculates the score in this case using the following Expression (4).

$$\text{Score}=(\text{Parameter value}-\text{Third threshold 1803})/(\text{Fourth threshold 1804}-\text{Third threshold 1803}) \qquad (4)$$

That is, the object detection device 1 calculates the score in this case by proportional calculation of the difference between the parameter value and the third threshold 1803 and the difference between the fourth threshold 1804 and the third threshold 1803. The score varies between 0.0 and 1.0.

FIG. 19 illustrates an example in which the detection object is a preceding vehicle 1901. In the example of FIG. 19, it is assumed that the value of the width, which is one of the parameters of the preceding vehicle 1901 as the detection object, is 1.6 m, the value of the depth, which is one of the parameters, is 3.2 m, and the value of the height, which is one of the parameters, is 1.6 m. At this time, the object detection device 1 calculates scores of the depth, the width, and the height, which are parameters of the preceding vehicle 1901, which is a detection object, for each type.

For example, when the value of the width, which is one of the parameters, is 1.6 m, since the value of the width 1.6 m is larger than the fourth threshold 1804 (0.6 m) for the type of pedestrian, the object detection device 1 sets the score of the width to 0.01. Since the width value 1.6 m is larger than the fourth threshold 1804 (1.3 m) for the type of two-wheeled vehicle, the object detection device 1 sets the width score to 0.01. Since the width value 1.6 m falls within the range of the second threshold 1802 (1.5 m) or more and the third threshold 1803 (2.0 m) or less for the type of four-wheeled vehicle, the object detection device 1 sets the width score to 1.0. Since the width value 1.6 m is within a range of the first threshold 1801 (1.4 m) or more and smaller than the second threshold 1802 (1.7 m) for the type of track, the object detection device 1 calculates the score using the above Expression (3). That is, (1.6−1.4)/(1.7−1.4)=0.67 is set as a score.

The object detection device 1 calculates scores for the depth and the height, which are other parameters, similarly to the width parameter. As a result, a score as illustrated in FIG. 19 is obtained.

After calculating the score, the object detection device 1 calculates the reliability for each type by multiplying the scores of the depth, the width, and the height. For example, with respect to the type of the pedestrian, the object detection device 1 sets 0.01×0.01×1.0=0.0001 as the reliability since the score of the width is 0.01, the score of the depth is 0.01, and the score of the height is 1.0. The object detection device 1 sets 0.01×0.01×1.0=0.0001 as the reliability for the type of two-wheeled vehicle. The object detection device 1 sets 1.0×1.0×1.0=1.0 as the reliability for the type of four-wheeled vehicle. The object detection device 1 sets 0.67× 1.0×0.01=0.0067 as the reliability for the type of track.

After calculating the reliability, the object detection device 1 determines the type of the detection object. In the example of FIG. 19, a first reference value 1902 of the reliability is 0.3, and a second reference value 1903 is 0.6. Since the reliability (0.0001) of the type of the pedestrian is smaller than the first reference value 1902 (0.3), the object detection device 1 determines that the pedestrian is negative as the type of the detection object. Since the reliability (0.0001) of the type of the two-wheeled vehicle is smaller than the first reference value 1902 (0.3), the object detection device 1 determines that the two-wheeled vehicle is negative

| as the type of the detection object. Since the reliability (0.0067) of the type of the track is smaller than the first reference value 1902 (0.3), the object detection device 1 determines that the track is negative as the type of the detection object. Since the reliability (1.0) of the type of the four-wheeled vehicle is greater than or equal to the second reference value 1903 (0.6), the object detection device 1 determines that the four-wheeled vehicle is determined as the type of the detection object. As a result, in the example of FIG. 19, since the object detection device 1 determines that only the four-wheeled vehicle is determined as the type of the detection object and determines that all the other types are negative, the type of the detection object is determined as the four-wheeled vehicle.

FIG. 20 illustrates an example in which the detection object is a preceding vehicle 2001. In a case where the score and the reliability as illustrated in FIG. 20 are calculated, the object detection device 1 determines that the four-wheeled vehicle is unknown as the type of the detection object, and determines that all the other types are negative. In this case, since the type of the detection object cannot be determined as a four-wheeled vehicle, the object detection device 1 registers the detection object in the caution-needed object list and sets the detection object as a target of re-scanning in the narrowing mode.

As described above, the object detection device 1 of Embodiment 1 includes the point cloud acquisition unit 201 that acquires the point cloud data of the object existing in the periphery according to the scanning result of the LiDAR 101 that is a sensor that scans the periphery of the vehicle, and the object detection unit 204 that detects the object based on the point cloud data. In addition, the object detection device 1 of Embodiment 1 includes the reliability determination unit 205 that determines the reliability in the detection result of the object detection unit 204. The point cloud acquisition unit 201 controls the scanning range and the irradiation density of the LiDAR 101 on the basis of the reliability.

As a result, the object detection device 1 of Embodiment 1 can appropriately select an object to be scanned while increasing the irradiation density, so that the efficiency can be improved while ensuring the detection accuracy. The object detection device 1 of Embodiment 1 can efficiently suppress the risk of collision with an object, and can contribute to safe automatic driving.

Further, in the object detection device 1 according to Embodiment 1, the LiDAR 101 can perform scanning in the normal mode and the narrowing mode. The reliability determination unit 205 determines the type of the detection object when the reliability is high, and registers the detection object in the caution-needed object list when the reliability is low. Then, the point cloud acquisition unit 201 causes the LiDAR 101 to re-scan the detection objects registered in the caution-needed object list in the narrowing mode, and re-acquires the point cloud data. The object detection unit 204 re-detects the detection object on the basis of the re-acquired point cloud data. The reliability determination unit 205 determines the reliability in the re-detection result of the object detection unit 204.

As a result, the object detection device 1 of Embodiment 1 can perform scanning in the normal mode in which an object in a wide range can be detected and the narrowing mode in which a specific object can be detected in detail, and can switch the scanning mode according to the situation around the vehicle. In particular, the object detection device 1 of Embodiment 1 can scan only an object, such as a distant object or a small object, for which the reliability of the detection result tends to be low, in the narrowing mode. The object detection device 1 of Embodiment 1 can secure the detection accuracy even for an object whose reliability tends to be low, and does not excessively increase the irradiation density even for an object whose reliability is high. Therefore, the object detection device 1 of Embodiment 1 can further improve the efficiency while securing the detection accuracy.

Further, in the object detection device 1 of Embodiment 1, when the reliability in the re-detection result is high, the reliability determination unit 205 excludes the detection object from the caution-needed object list. The point cloud acquisition unit 201 causes the LiDAR 101 to scan a new object different from the detection object in the normal mode, and newly acquires point cloud data.

As a result, the object detection device 1 of Embodiment 1 can exclude the detection object having high reliability in the re-detection result from the scanning target in the narrowing mode, and can quickly detect even if an unknown object appears. Therefore, the object detection device 1 of Embodiment 1 can further improve the efficiency while securing the detection accuracy.

Further, in the object detection device 1 of Embodiment 1, a parameter that is an index representing an attribute of an object and a possible range of the parameter for each type are determined in advance in the reliability determination unit 205. The reliability determination unit 205 calculates a score that quantifies the compatibility of the parameter of the detection object with the above range, and calculates the reliability using the score.

As a result, the object detection device 1 of Embodiment 1 can quantitatively evaluate the reliability serving as a basis for determining whether to perform scanning in the narrowing mode, and thus, it is possible to further improve the efficiency while securing the detection accuracy.

Modification of Score Calculation Method

A score calculation method different from that in FIGS. 18 to 20 will be described with reference to FIGS. 21 to 23.

Figure 21:
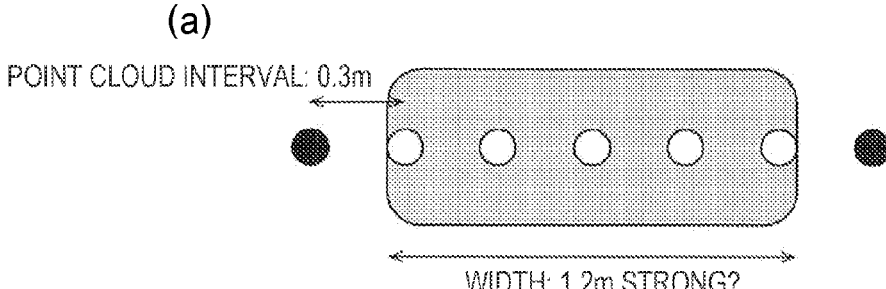
FIG. 21(*a*) is a diagram for explaining a lower limit value in a range of an estimated value of a parameter of a detection object in a case where one object is scanned in a normal mode, FIG. 21(*b*) is a diagram for explaining an upper limit value in a range of an estimated value of a parameter of a detection object in the case illustrated in FIG. 21(*a*), and FIG. 21(*c*) is a diagram illustrating a case where two objects are scanned in the normal mode and the object detection device detects the two objects as one object.
Figure 21:
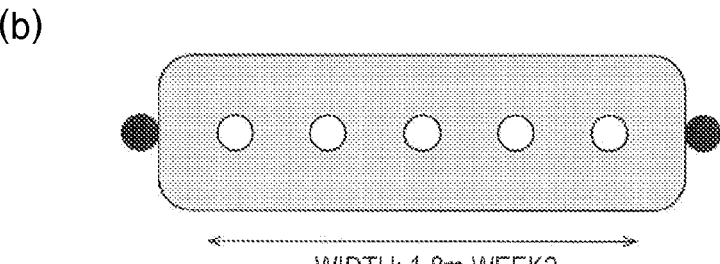
Figure 21:
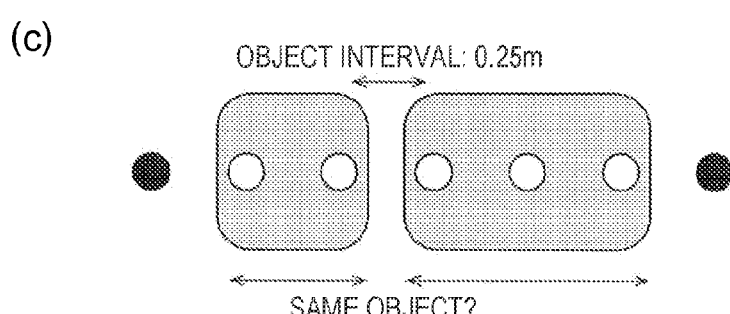
Figure 22:
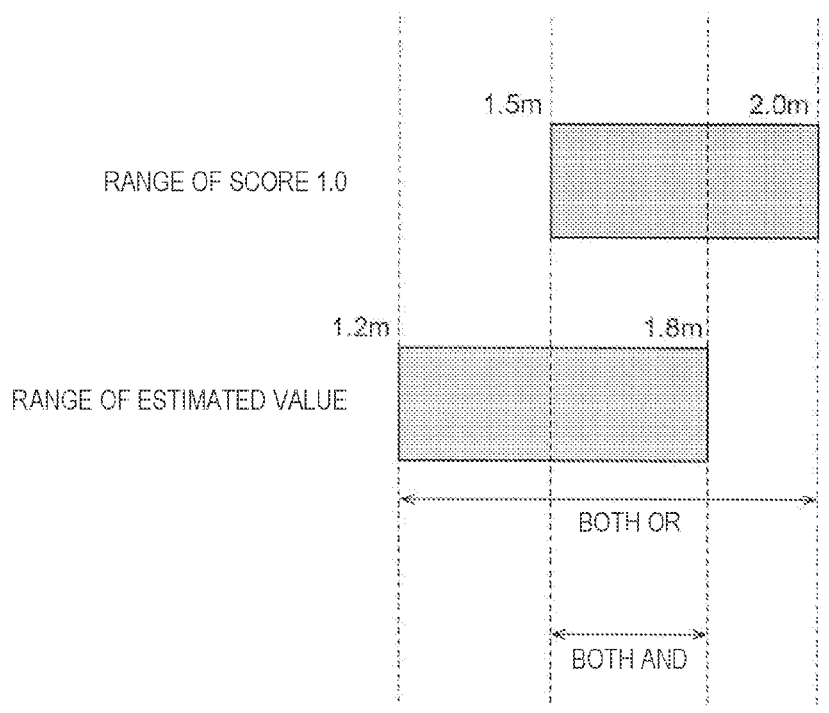
FIG. 22 is a diagram for explaining a modification of the score calculation method.
Figure 22:
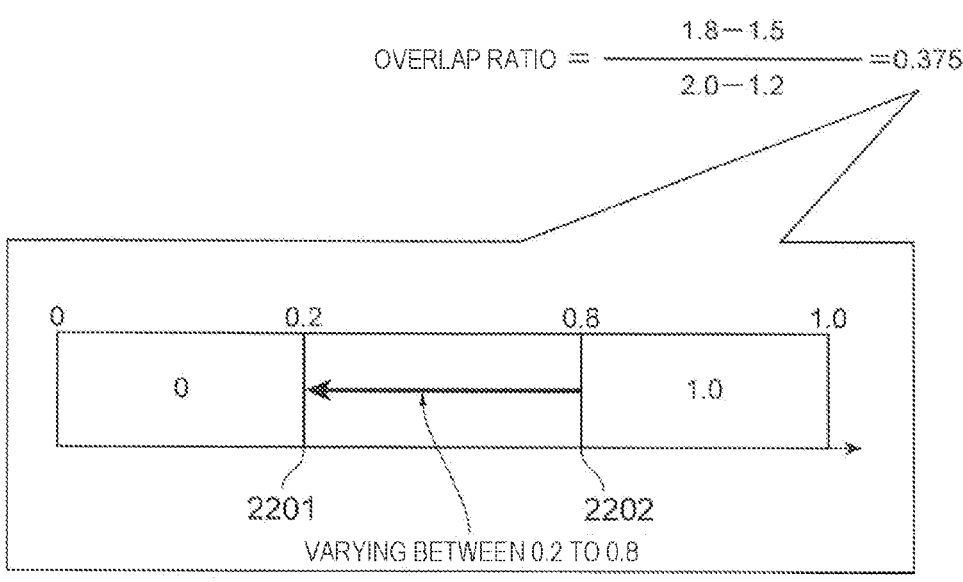

FIG. 21(*a*) is a diagram for explaining a lower limit value in the range of the estimated value of the parameter of the detection object when one object is scanned in the normal mode. FIG. 21(*b*) is a diagram for explaining an upper limit value in the range of the estimated value of the parameter of the detection object in the case illustrated in FIG. 21(*a*). FIG. 21(*c*) is a diagram for explaining a case where two objects are scanned in the normal mode and the object detection device 1 detects the objects as one object. FIG. 22 is a diagram for explaining a modification of the score calculation method.

FIGS. 21(*a*) and 21(*b*) illustrate a case where one object having a width of 1.2 m, which is one of the parameters of the detection object, is scanned in the normal mode with a point cloud interval of 0.3 m. FIG. 21(*c*) illustrates a case where two objects each having an interval of 0.25 m and a total width of 1.2 m are scanned in the normal mode with a point cloud interval of 0.3 m. In FIGS. 21(*a*) to 21(*c*), a white circle indicates the point group of the detection object, a black circle indicates the point group deviated from the detection object, and a gray portion indicates the width of the detection object estimated by the object detection device 1.

In calculating the score, the object detection device 1 calculates a range of an estimated value which is a numerical value estimated as a parameter of the detection object from the scanning result. The object detection device 1 calculates the overlap ratio between the range of the estimated value of the parameter and the range in which the score of the parameter is 1.0. The object detection device 1 calculates a score based on the overlap ratio.

The range in which the score of the parameter is 1.0 is a range from the second threshold 1802 to the third threshold 1803 illustrated in FIG. 18. The overlap ratio is calculated using the range of the union (OR) of the range of the estimated value of the parameter and the range in which the score of the parameter is 1.0, and the range of the intersection (AND) of the range of the estimated value of the parameter and the range in which the score of the parameter is 1.0. Specifically, the object detection device 1 calculates the overlap ratio using the following Expression (5).

$$\text{Overlap ratio}=(\text{upper limit value of intersection set}-\text{lower limit value of intersection set})/(\text{upper limit value of sum set}-\text{lower limit value of sum set}) \quad (5)$$

That is, the object detection device 1 calculates the overlap ratio by proportional calculation of the difference between the upper limit value and the lower limit value of the range of the union and the difference between the upper limit value and the lower limit value of the range of the intersection set. The numerical range of the overlap ratio is 0.0 or more and 1.0 or less.

The object detection device 1 sets the score to 0.0 when the overlap ratio is smaller than a first predetermined value 2201 (for example, 0.2). The object detection device 1 sets the score to 1.0 when the overlap ratio is a second predetermined value 2202 (for example, 0.8) or more. When the overlap ratio is equal to or larger than the first predetermined value 2201 (for example, 0.2) and smaller than the second predetermined value 2202 (for example, 0.8), the object detection device 1 calculates a score according to the value of the overlap ratio. Specifically, the object detection device 1 calculates the score in this case using the following Expression (6).

$$\text{Score}=(\text{value of overlap ratio}-\text{first predetermined value 2201})/(\text{second predetermined value 2202}-\text{first predetermined value 2201}) \quad (6)$$

That is, the object detection device 1 calculates the score in this case by proportional calculation of the difference between the value of the overlap ratio and the first predetermined value 2201 and the difference between the second predetermined value 2202 and the first predetermined value 2201. The score varies between 0.0 and 1.0.

In the examples of FIGS. 21(*a*) and 21(*b*), there are four point cloud intervals of 0.3 m between both ends of the width that is one of the parameters of the detection object. As illustrated in FIG. 21(*a*), the object detection device 1 estimates the lower limit value in the range of the estimated value of the width as 0.3 m×4=1.2 m. As illustrated in FIG. 21(*b*), the object detection device 1 estimates the upper limit value in the range of the estimated value of the width as 0.3 m×(4+2)=1.8 m. That is, in the examples of FIGS. 21(*a*) and 21(*b*), the object detection device 1 calculates the range of the estimated value of the width as a range of 1.2 m or more and less than 1.8 m. In FIG. 22, a range in which the score of the width in the type of four-wheeled vehicle is 1.0 is illustrated. The range in which the score of the width in the type of four-wheeled vehicle is 1.0 is 1.5 m or more and 2.0 m or less when referring to the range of the second threshold 1802 or more and the third threshold 1803 or less illustrated in FIG. 18. In the example of FIG. 22, the range of the union is a range of 1.2 m or more and 2.0 m or less. The range of the intersection set is a range of 1.5 m or more and less than 1.8 m. Therefore, the overlap ratio is calculated as (1.8 m−1.5 m)/(2.0 m−1.2 m)=0.375 using the above Expression (5). The overlap ratio of 0.375 is greater than or equal to the first predetermined value 2201 (0.2) and smaller than the second predetermined value 2202 (0.8). Therefore, the score is calculated as (0.375−0.2)/(0.8−0.2)=0.29 using the above Expression (6). In the examples of FIGS. 21(*a*) and 21(*b*), the object detection device 1 evaluates that the width of the detection object does not satisfy at least the condition of the width of the four-wheeled vehicle.

The object detection device 1 similarly calculates the overlap ratio and the score for the other types. The object detection device 1 calculates the overlap ratio and the score for the depth and the height, which are other parameters, similarly to the width parameter. Then, the object detection device 1 calculates the reliability for each type by multiplying each score of the depth, the width, and the height, which are parameters of the detection object, for each type. As a result, if the type of the detection object cannot be determined, the object detection device 1 performs re-scanning in the narrowing mode.

Figure 23:
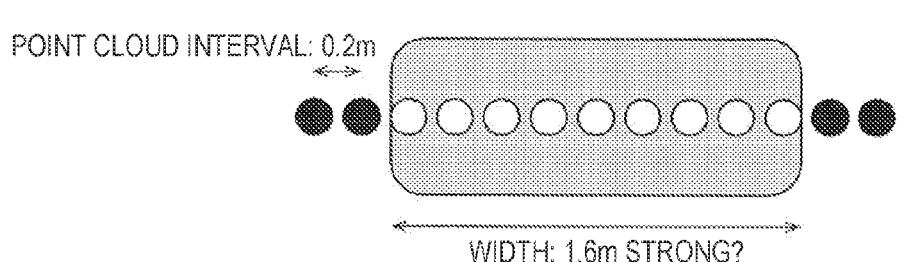
FIG. 23(*a*) is a diagram for explaining a lower limit value in the range of the estimated value of the parameter of the detection object in a case where the object illustrated in FIG. 21(*a*) is re-scanned in the narrowing mode, FIG. 23(*b*) is a diagram for explaining an upper limit value in the range of the estimated value of the parameter of the detection object in a case illustrated in FIG. 23(*a*), and FIG. 23(*c*) is a diagram illustrating a case where the object illustrated in FIG. 21(*c*) is re-scanned in the narrowing mode and the object detection device detects the object as a separate object.
Figure 23:
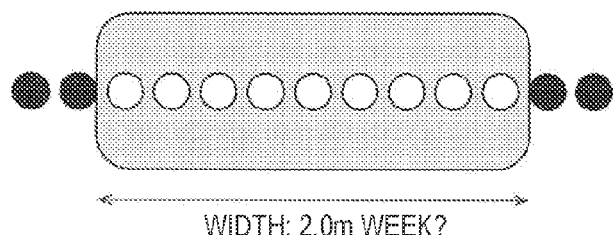
Figure 23:
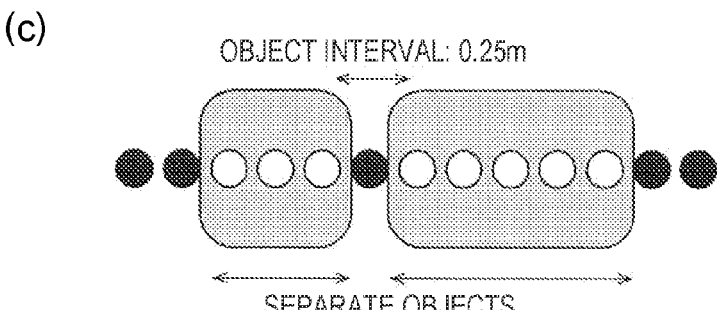

FIG. 23(*a*) is a diagram for explaining a lower limit value in the range of the estimated value of the parameter of the detection object in a case where the object illustrated in FIG. 21(*a*) is re-scanned in the narrowing mode. FIG. 23(*b*) is a diagram for explaining an upper limit value in the range of the estimated value of the parameter of the detection object in the case illustrated in FIG. 23(*a*). FIG. 23(*c*) is a diagram for explaining a case where the object illustrated in FIG. 21(*c*) is re-scanned in the narrowing mode and the object detection device 1 detects the objects as separate objects.

FIGS. 23(*a*) and 23(*b*) illustrate a case where the object illustrated in FIGS. 21(*a*) and 21(*b*) is re-scanned in the narrowing mode in which the point cloud interval is 0.2 m. FIG. 23(*c*) illustrates a case where the object illustrated in FIG. 21(*c*) is re-scanned in the narrowing mode in which the point cloud interval is 0.2 m.

In the examples of FIGS. 23(*a*) and 23(*b*), there are eight point cloud intervals of 0.2 m between both ends of the width that is one of the parameters of the detection object. As illustrated in FIG. 23(*a*), the object detection device 1 estimates the lower limit value in the range of the estimated value of the width as 0.2 m×8=1.6 m. As illustrated in FIG. 23(*b*), the object detection device 1 estimates the upper limit value in the range of the estimated value of the width as 0.2 m×(8+2)=2.0 m. That is, in the examples of FIGS. 23(*a*) and 23(*b*), the object detection device 1 calculates the range of the estimated value of the width as a range of 1.6 m or more and less than 2.0 m. The range in which the score of the width in the type of four-wheeled vehicle is 1.0 is 1.5 m or more and 2.0 m or less. In the examples of FIGS. 23(*a*) and 23(*b*), the range of the union is a range of 1.5 m or more and 2.0 m or less. The range of the intersection set is a range of 1.6 m or more and less than 2.0 m. Therefore, the overlap ratio is calculated as (2.0−1.6)/(2.0−1.5)=0.8 using the above Expression (5). The overlap ratio of 0.8 is the second predetermined value 2202 (0.8) or more. The object detection device 1 has a score of 1.0. In the examples of FIGS. 23(*a*) and 23(*b*), the object detection device 1 evaluates that the width of the detection object satisfies at least the condition of the width of the four-wheeled vehicle.

As illustrated in FIG. 21(*c*), when the interval (0.25 m) between the two objects is shorter than the point cloud interval (0.3 m), the object detection device 1 detects the two objects as one detection object. As illustrated in FIG. 23(*c*), when the interval (0.25 m) between the two objects is longer than the point cloud interval (0.2 m), the object detection device 1 can detect the two objects as separate detection objects.

As described above, the object detection device 1 can calculate the score quantitatively evaluating the reliability serving as the basis for determining whether to perform the scanning in the narrowing mode using the overlap ratio. Therefore, since the object detection device 1 can more accurately evaluate the reliability than the method illustrated in FIGS. 18 to 20, the efficiency can be further improved while securing the detection accuracy.

Embodiment 2

An object detection device 1 according to Embodiment 2 will be described with reference to FIGS. 24 and 25. In the description of Embodiment 2, the description of the same configuration and operation as those of Embodiment 1 will be omitted.

Figure 24:
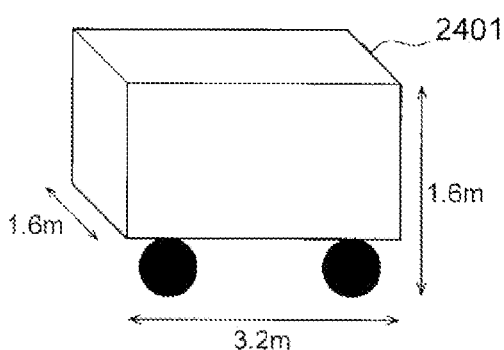
FIG. 24 is a diagram illustrating an example of a detection object in an object detection device according to Embodiment 2.
Figure 24:
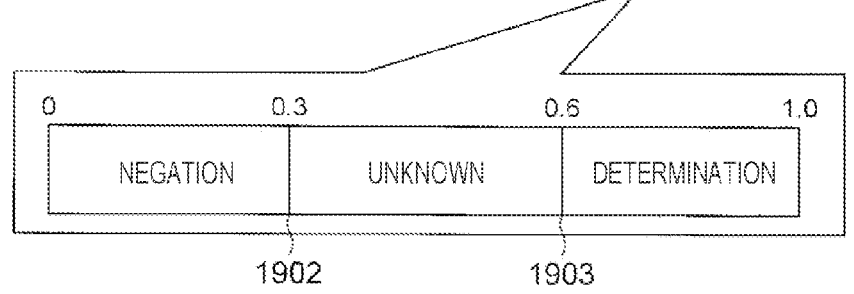

FIG. 24 is a diagram illustrating an example of a detection object in the object detection device 1 of Embodiment 2.

In Embodiment 1, as illustrated in FIG. 19, the case where the object detection device 1 detects the preceding vehicle 1901 from behind has been described. In Embodiment 2, a case where the object detection device 1 detects a vehicle 2401 from the side like the vehicle 2401 entering from the lateral direction at the intersection will be described.

In the example of FIG. 24, it is assumed that the value of the width, which is one of the parameters of the vehicle 2401 as the detection object, is 1.6 m, the value of the depth, which is one of the parameters, is 3.2 m, and the value of the height, which is one of the parameters, is 1.6 m. At this time, when the object detection device 1 calculates the scores of the depth, the width, and the height assuming that the vehicle 2401 is the preceding vehicle, the calculation result of the score and the reliability and the determination result of the type are as illustrated in FIG. 24. That is, when the vehicle 2401 is regarded as a preceding vehicle, the score and the reliability are low for all types, and all types are determined as negative, so that the object detection device 1 cannot determine the type of the detection object.

In the object detection device 1 of Embodiment 2, in a case where the reliability is low such as a case where the type of the detection object cannot be determined, the reliability determination unit 205 recalculates each score by replacing the depth and the width, which are parameters of the detection object, before registering the detection object in the caution-needed object list. The reliability determination unit 205 of Embodiment 2 recalculates the reliability using the recalculated score. In the example of FIG. 24, when the depth and the width are interchanged, the value of each parameter of the detection object becomes the same as that in FIG. 19, so that the type of the detection object can be determined as a four-wheeled vehicle. When it is determined that the recalculated reliability is low and the type of the detection object is unknown, the reliability determination unit 205 of Embodiment 2 registers the detection object in the caution-needed object list as in Embodiment 1.

Figure 25:
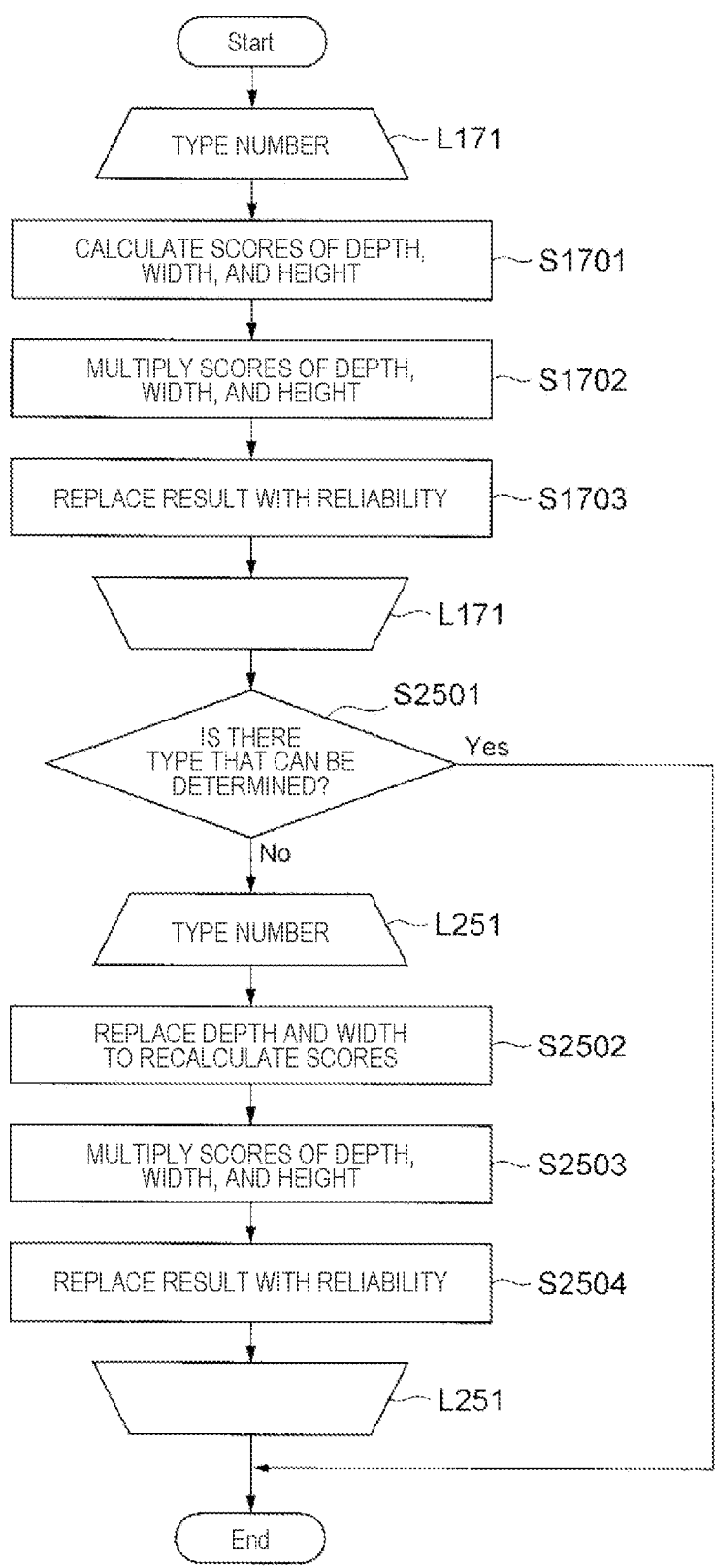
FIG. 25 is a flowchart illustrating a flow of processing related to calculation of a reliability performed by the object detection device of Embodiment 2.

FIG. 25 is a flowchart illustrating a flow of processing related to calculation of reliability performed by the object detection device 1 of Embodiment 2. The process illustrated in FIG. 25 corresponds to the processing illustrated in FIG. 17 in Embodiment 1.

The object detection device 1 of Embodiment 2 performs processing similar to that of Loop L171 illustrated in FIG.

17. After performing Loop L171 by a predetermined number of types, the object detection device 1 exits Loop L171 and proceeds to Step S2501.

In Step S2501, the object detection device 1 determines whether there is a type that can be determined as the type of the detection object represented by the group. In a case where there is a type that can be determined, the object detection device 1 ends the processing illustrated in FIG. 25. When there is no type that can be determined, the object detection device 1 proceeds to Loop L251. In Loop L251, the object detection device 1 performs Steps S2502 to S2504 by the same number of types as Loop L171.

In Step S2502, the object detection device 1 replaces the depth and the width of the detection object represented by the group and recalculates the respective scores.

In Step S2503, the object detection device 1 replaces the depth and the width and multiplies them by the recalculated score.

In Step S2504, the object detection device 1 replaces the calculation result of Step S2503 with the reliability.

After Step S2504, the object detection device 1 performs Loop L251 for another type. After performing Loop L251 by the number of types, the object detection device 1 exits Loop L251 and ends the processing illustrated in FIG. 25.

As described above, in the object detection device 1 according to Embodiment 2, in a case where the reliability is low, the reliability determination unit 205 recalculates each score by replacing the depth and the width, which are parameters of the detection object, before registering the detection object in the caution-needed object list. The reliability determination unit 205 of Embodiment 2 recalculates the reliability using the recalculated score, and registers the detection object in the caution-needed object list when the recalculated reliability is low.

As a result, the object detection device 1 of Embodiment 2 can appropriately determine the type even when a vehicle is detected from the side, such as a vehicle entering from the lateral direction at the intersection. Therefore, the object detection device 1 of Embodiment 2 can detect an object with high accuracy flexibly corresponding to various surrounding situations, and can improve the detection accuracy as compared with Embodiment 1.

Embodiment 3

An object detection device 1 according to Embodiment 3 will be described with reference to FIG. 26. In the description of Embodiment 3, the description of the same configuration and operation as those of Embodiment 1 will be omitted.

In Embodiment 1, when it is determined that the type of the detection object is unknown, the detection object is registered in the caution-needed object list. In Embodiment 3, attention is paid not only to the determination result of the type of the detection object but also to the speed of the detection object. Specifically, in the object detection device 1 of Embodiment 3, when the reliability is low and the type of the detection object is determined to be unknown, the reliability determination unit 205 calculates the variance value of the velocity of the detection object before registering the detection object in the caution-needed object list. In a case where the calculated variance value is larger than a threshold, the reliability determination unit 205 of Embodiment 3 registers the detection object in the caution-needed object list.

The reliability determination unit 205 of Embodiment 3 can calculate the speed and the moving direction of the detection object by the object tracking unit 207 that tracks the movement of the detection object. The object tracking unit 207 calculates the speed and the moving direction of the detection object by comparing the current position and the previous position of the detection object. The object tracking unit 207 can specify the previous position of the detection object by searching for the position where the detection object was detected in the previous processing around the current position of the detection object and extracting the optimum position.

Figure 26:
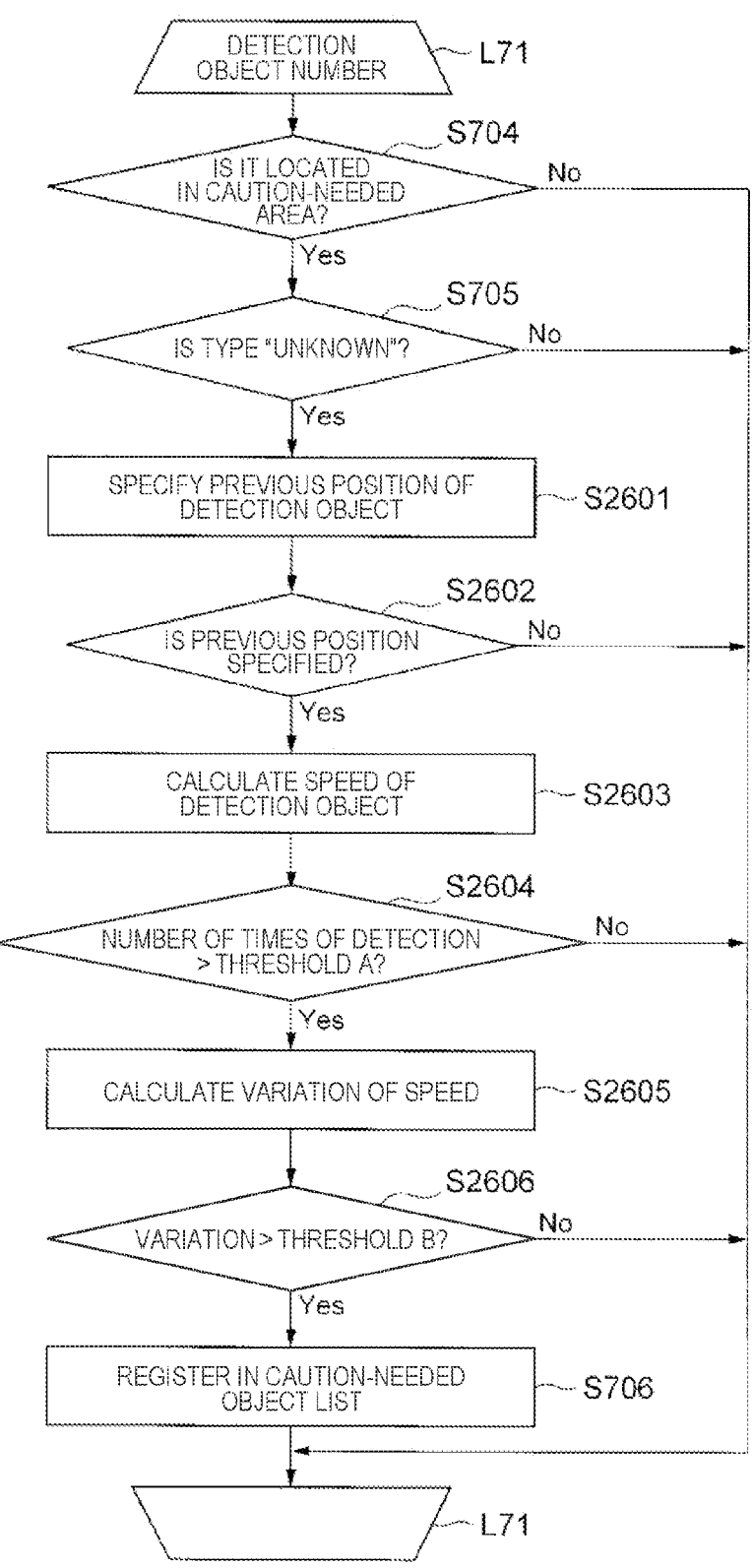
FIG. 26 is a flowchart illustrating a flow of processing performed by an object detection device of Embodiment 3.

FIG. 26 is a flowchart illustrating a flow of processing performed by the object detection device 1 of Embodiment 3. The processing illustrated in FIG. 26 corresponds to Loop L71 illustrated in FIG. 7 in Embodiment 1.

In Loop L71 illustrated in FIG. 26, the object detection device 1 of Embodiment 3 performs Steps S704 to S706 similarly to Loop L71 illustrated in FIG. 7. However, the object detection device 1 of Embodiment 3 performs Steps S2601 to S2606 between Steps S705 and S706 in Loop L71 illustrated in FIG. 26. That is, when it is determined in Step S705 that the type of the detection object is unknown, the object detection device 1 of Embodiment 3 proceeds to Step S2601.

In Step S2601, the object detection device 1 specifies the previous position of the detection object. As described above, the object detection device 1 specifies the previous position of the detection object by searching for the position where the detection object was detected in the previous processing around the current position of the detection object.

In Step S2602, the object detection device 1 determines whether the previous position of the detection object has been specified in Step S2601. When the previous position of the detection object is not specified, the object detection device 1 performs Loop L71 on another detection object. When the previous position of the detection object is specified, the object detection device 1 proceeds to Step S2603.

In Step S2603, the object detection device 1 calculates the speed and the moving direction of the detection object by comparing the current position and the previous position of the detection object.

In Step S2604, the object detection device 1 determines whether the number of times of detection of the detection object is larger than a threshold A. The threshold A is an upper limit value of the number of times of detection such that the calculation result when the variance of the speed is calculated lacks statistical reliability. When the number of times of detection of the detection object is equal to or less than the threshold A, the object detection device 1 performs Loop L71 on another detection object. When the number of times of detection of the detection object is larger than the threshold A, the object detection device 1 proceeds to Step S2605.

In Step S2605, the object detection device 1 calculates the variance of the velocity of the detection object.

In Step S2606, the object detection device 1 determines whether the calculated variance value of the speed is larger than a threshold B. The threshold B is an upper limit value of a variance value at which it can be determined that the detection object has speed stability. That is, when the speed of the detection object rapidly changes, the variance value of the speed of the detection object is larger than the threshold B. When the variance value of the speed is equal to or less than the threshold B, the object detection device 1 performs Loop L71 on another detection object. In a case where the variance value of the speed is larger than the threshold B, the object detection device 1 proceeds to Step S706 and registers the detection object in the caution-needed list.

After Step S706, the object detection device 1 performs Loop L71 on another detection object. After performing Loop L71 by the number of detection objects, the object detection device 1 exits Loop L71 and ends the processing illustrated in FIG. 26.

As described above, in the object detection device 1 of Embodiment 3, when the reliability is low and the type of the detection object is determined to be unknown, the reliability determination unit 205 calculates the variance value of the speed of the detection object before registering the detection object in the caution-needed object list. In a case where the calculated variance value is larger than a threshold, the reliability determination unit 205 of Embodiment 3 registers the detection object in the caution-needed object list.

As a result, in the object detection device 1 of Embodiment 3, it is possible to preferentially scan a detection object whose speed rapidly changes in the narrowing mode among detection objects with low reliability such as detection objects with an unknown type. Therefore, the object detection device 1 of Embodiment 3 can flexibly cope with various surrounding situations, and the efficiency can be improved as compared with Embodiment 1.

In FIG. 26, the object detection device 1 according to Embodiment 3 performs Steps S2601 to S2605 between Steps S705 and S706. The object detection device 1 of Embodiment 3 is not limited thereto, and Steps S2601 to S2605 may be performed in parallel with Step S705. Specifically, when determining in Step S704 that the detection object is located in the caution-needed area, the object detection device 1 of Embodiment 3 proceeds to each of Steps S705 and S2601. Then, in a case where it is determined in Step S705 that the type of the detection object is unknown, the object detection device 1 of Embodiment 3 proceeds to Step S706, and in a case where the variance value of the speed is larger than the threshold B in Step S2606, the object detection device 1 proceeds to Step S706. As a result, when it is determined that the type of the detection object is unknown or when the variance value of the speed of the detection object is larger than the threshold B, the object detection device 1 of Embodiment 3 can scan the detection object in the narrowing mode.

Note that, in the above embodiment, an example has been described in which the object detection device 1 includes the LiDAR 101 that emits a laser beam as a sensor that scans the surroundings of the vehicle. The object detection device 1 is not limited thereto, and may include a sensor that emits an electromagnetic wave or a sound wave as a sensor that scans the periphery of the vehicle.

Others

Further, the present invention is not limited to the above embodiments, and various modifications may be contained. For example, the above-described embodiments of the present invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

Each of the above configurations, functions, processing units, processing means, and the like may be partially or entirely achieved by hardware by, for example, designing by an integrated circuit. In addition, the configurations and the functions may be realized in software such that a processor analyzes and performs a program which realizes each function. Information such as a program, a tape, and a file for realizing each function can be stored in a recording device such as a memory, a hard disk, and a solid state drive (SSD), or a recording medium such as an IC card, an SD card, and a DVD.

In addition, only control lines and information lines considered to be necessary for explanation are illustrated, but not all the control lines and the information lines for a product are illustrated. In practice, almost all the configurations may be considered to be connected to each other.

REFERENCE SIGNS LIST 1 object detection device
101 LiDAR (sensor)
201 point cloud acquisition unit
204 object detection unit
205 reliability determination unit
503 caution-needed object list

The invention claimed is:

1. An object detection device comprising:
a point cloud acquisition unit configured to acquire point cloud data of an object existing in a periphery of a vehicle according to a scanning result of a sensor that scans the periphery of the vehicle;
an object detection unit configured to detect the object based on the point cloud data; and
a reliability determination unit configured to:
determine a reliability in a detection result of the object detection unit,
determine a type of a detection object that is the object of the detection result when the reliability is high, and
when the reliability is low, the detection object is registered in a caution-needed object list, wherein:
the point cloud acquisition unit controls a scanning range and an irradiation density of the sensor based on the reliability;
the sensor can perform scanning in a normal mode and a narrowing mode in which the scanning range is reduced and the irradiation density is increased as compared with the normal mode;

the point cloud acquisition unit causes the sensor to re-scan the detection object registered in the caution-needed object list in the narrowing mode and re-acquires the point cloud data;
the object detection unit re-detects the detection object based on the re-acquired point cloud data; and
the reliability determination unit determines the reliability in a re-detection result of the object detection unit.

2. The object detection device according to claim 1, wherein
the reliability determination unit excludes the detection object from the caution-needed object list when the reliability in the re-detection result is high, and
the point cloud acquisition unit causes the sensor to scan a new object different from the detection object in the normal mode, and newly acquires the point cloud data.

3. The object detection device according to claim 1, wherein
a parameter that is an index representing an attribute of the object and a possible range of the parameter for each type are determined in advance in the reliability determination unit, and
the reliability determination unit calculates a score obtained by quantifying compatibility of the parameter of the detection object with the range, and calculates the reliability using the score.

4. The object detection device according to claim 3, wherein
the parameter is each of a depth, a width, and a height of the object, and
the reliability determination unit is configured to:
when the reliability is low, replace the depth and the width of the detection object before the detection object is registered in the caution-needed object list to recalculate the score, and recalculate the reliability using the recalculated score; and
register the detection object in the caution-needed object list when the recalculated reliability is low.

5. The object detection device according to claim 1, wherein
the reliability determination unit calculates a variance of a speed of the detection object before the detection object is registered in the caution-needed object list when the reliability degree is low, and registers the detection object in the caution-needed object list when a variance value is larger than a threshold.

* * * * *